(12) United States Patent
Nyalamadugu et al.

(10) Patent No.: US 12,670,354 B2
(45) **Date of Patent: \*Jun. 30, 2026**

(54) RFID SWITCH TAG

(71) Applicant: NEOLOGY, INC., Carlsbad, CA (US)

(72) Inventors: Sheshi Nyalamadugu, San Diego, CA (US); Joe Mullis, Oceanside, CA (US)

(73) Assignee: NEOLOGY, INC., Carlsbad, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/225,198

(22) Filed: Jun. 2, 2025

(65) Prior Publication Data

US 2025/0292056 A1     Sep. 18, 2025

Related U.S. Application Data

(63) Continuation of application No. 18/592,463, filed on Feb. 29, 2024, now Pat. No. 12,321,800, which is a
(Continued)

(51) Int. Cl.
G06K 19/077 (2006.01)
G06K 19/04 (2006.01)
(Continued)

(52) U.S. Cl.
CPC ..... G06K 19/07715 (2013.01); G06K 19/041 (2013.01); G06K 19/07345 (2013.01);
(Continued)

(58) Field of Classification Search
CPC ........... G06K 19/07715; G06K 19/041; G06K 19/07345; G06K 19/07701
(Continued)

(56) References Cited

U.S. PATENT DOCUMENTS

| | | | |
|---|---|---|---|
| 674,284 | A | 5/1901 | Sachs |
| 4,268,834 | A | 5/1981 | Henry |
| | | (Continued) | |

FOREIGN PATENT DOCUMENTS

| | | |
|---|---|---|
| CN | 101425148 A | 5/2009 |
| CN | 101752648 A | 6/2010 |
| | (Continued) | |

OTHER PUBLICATIONS

Declaration of Bruce Roesner in Support of Petitioner's Opposition to Patent Owner's Contingent Motion to Amend, Inter Partes Review of U.S. Pat. No. 8,944,337, IPR Case No. IPR2016-01763, Exhibit No. 1031, exhibit filing date Sep. 21, 2017, pp. 1-35.
(Continued)

*Primary Examiner* — Allyson N Trail
(74) *Attorney, Agent, or Firm* — Buchalter LLP

(57)     ABSTRACT

A switchable radio-frequency identification (RFID) tag device comprising: a first RFID module positioned on a first plane; at least one un-tuned antenna section positioned on a second plane, wherein the first plane is positioned parallel to the second plane; a second RFID module positioned on the first plane; a third RFID module positioned on the first plane; and a sliding mechanism configured to move between a first position, a second position, and a third position; and wherein, in the first position, the first RFID module is coupled to the at least one un-tuned antenna section to form a tuned RFID tag, and the second and third RFID modules are detuned and/or inoperable; and in the second position, the second RFID module is coupled to the at least one un-tuned antenna section to form a tuned RFID tag, and the first RFID module and third RFID module are detuned and/or inoperable; and in the third position, the third RFID module is coupled to the at least one un-tuned antenna
(Continued)

section to form a tuned RFID tag, and the first and second RFID modules are detuned and/or inoperable.

10 Claims, 16 Drawing Sheets

Related U.S. Application Data continuation of application No. 18/205,406, filed on Jun. 2, 2023, now Pat. No. 11,948,035, which is a continuation-in-part of application No. 17/728,115, filed on Apr. 25, 2022, now Pat. No. 11,775,795, which is a continuation of application No. 17/142,159, filed on Jan. 5, 2021, now Pat. No. 11,334,782, which is a continuation of application No. 16/677,663, filed on Nov. 7, 2019, now Pat. No. 10,885,418, which is a continuation-in-part of application No. 16/384,643, filed on Apr. 15, 2019, now Pat. No. 10,671,904, which is a continuation of application No. 15/996,345, filed on Jun. 1, 2018, now Pat. No. 10,262,253, which is a continuation of application No. 15/705,198, filed on Sep. 14, 2017, now Pat. No. 10,147,034, and a continuation of application No. 15/705,210, filed on Sep. 14, 2017, now Pat. No. 10,140,568, said application No. 15/705,198 is a continuation of application No. 15/445,731, filed on Feb. 28, 2017, now Pat. No. 9,767,404, said application No. 15/705,210 is a continuation of application No. 15/257,814, filed on Sep. 6, 2016, now Pat. No. 9,767,403, said application No. 15/445,731 is a continuation of application No. 14/578,196, filed on Dec. 19, 2014, now Pat. No. 9,582,746, said application No. 15/257,814 is a continuation of application No. 14/480,458, filed on Sep. 8, 2014, now Pat. No. 9,436,900, said application No. 14/578,196 is a continuation of application No. 14/060,407, filed on Oct. 22, 2013, now Pat. No. 8,944,337, which is a continuation of application No. 13/465,834, filed on May 7, 2012, now Pat. No. 8,561,911, said application No. 14/480,458 is a continuation of application No. 13/465,829, filed on May 7, 2012, now Pat. No. 8,844,831.

(60) Provisional application No. 62/757,018, filed on Nov. 7, 2018, provisional application No. 61/487,372, filed on May 18, 2011, provisional application No. 61/483,586, filed on May 6, 2011.

(51) Int. Cl.
*G06K 19/073* (2006.01)
*H01Q 1/22* (2006.01)

(52) U.S. Cl.
CPC . *G06K 19/07701* (2013.01); *G06K 19/07703* (2013.01); *G06K 19/07745* (2013.01); *G06K 19/07754* (2013.01); *G06K 19/07773* (2013.01); *G06K 19/07794* (2013.01); *H01Q 1/2225* (2013.01)

(58) Field of Classification Search
USPC ....................................................... 235/492
See application file for complete search history.

(56) References Cited

U.S. PATENT DOCUMENTS

| | | | |
|---|---|---|---|
| 5,337,063 A | 8/1994 | Takahira | |
| 5,464,011 A | 11/1995 | Bridge | |
| 5,659,324 A | 8/1997 | Taniguchi et al. | |
| 5,809,142 A | 9/1998 | Hurta et al. | |
| 5,940,006 A | 8/1999 | MacLellan et al. | |
| 6,121,544 A | 9/2000 | Petsinger | |
| 6,259,367 B1 | 7/2001 | Klein | |
| 6,342,839 B1 | 1/2002 | Curkendall et al. | |
| 6,378,774 B1 | 4/2002 | Emori et al. | |
| 6,466,131 B1 | 10/2002 | Tuttle et al. | |
| 6,522,308 B1 | 2/2003 | Mathieu | |
| 6,653,946 B1 | 11/2003 | Hassett | |
| 7,034,688 B2 | 4/2006 | Rietzler et al. | |
| 7,081,819 B2 | 7/2006 | Martinez de Velasco Cortina et al. | |
| 7,091,860 B2 | 8/2006 | Martinez de Velasco Cortina et al. | |
| 7,120,987 B2 | 10/2006 | Liu et al. | |
| 7,361,251 B2 | 4/2008 | Green et al. | |
| 7,437,148 B1 | 10/2008 | Vaghi et al. | |
| 7,460,018 B2 | 12/2008 | Kubo | |
| 7,463,154 B2 | 12/2008 | Cortina et al. | |
| 7,571,694 B2 | 8/2009 | Boerner | |
| 7,671,746 B2 | 3/2010 | Martinez de Velasco Cortina et al. | |
| 7,782,206 B2 | 8/2010 | Burnett et al. | |
| 7,859,393 B2 | 12/2010 | Suzuki et al. | |
| 8,004,410 B2 | 8/2011 | Martinez De Velasco Cortina et al. | |
| 8,065,181 B2 | 11/2011 | McNew et al. | |
| 8,095,154 B1 | 1/2012 | Wang et al. | |
| RE43,355 E | 5/2012 | Martinez et al. | |
| 8,228,199 B2 | 7/2012 | Noakes et al. | |
| 8,237,568 B2 | 8/2012 | Martinez De Velasco Cortina et al. | |
| 8,322,044 B2 | 12/2012 | Gregory et al. | |
| 8,344,890 B2 | 1/2013 | Zhu et al. | |
| 8,350,673 B2 | 1/2013 | Nyalamadugu et al. | |
| 8,416,079 B2 | 4/2013 | Roesner | |
| 8,561,911 B2 | 10/2013 | Mullis et al. | |
| 8,566,148 B2 | 10/2013 | Karner | |
| 8,604,995 B2 | 12/2013 | Hammad | |
| RE44,691 E | 1/2014 | Martinez et al. | |
| 8,700,729 B2 | 4/2014 | Dua | |
| 8,710,960 B2 | 4/2014 | Nyalamadugu et al. | |
| 8,844,831 B2 | 9/2014 | Mullis et al. | |
| 8,914,061 B2 | 12/2014 | Charrat et al. | |
| 8,941,497 B2 | 1/2015 | Rofougaran et al. | |
| 8,944,337 B2 | 2/2015 | Mullis et al. | |
| 9,007,215 B2 | 4/2015 | Zhu et al. | |
| 9,098,790 B2 | 8/2015 | Nyalamadugu et al. | |
| 9,172,130 B2 | 10/2015 | Forster | |
| 9,355,398 B2 | 5/2016 | Martinez De Velasco Cortina et al. | |
| 9,436,900 B2 | 9/2016 | Mullis et al. | |
| 9,582,746 B2 | 2/2017 | Mullis et al. | |
| 9,646,242 B2 | 5/2017 | Hofer et al. | |
| 9,767,331 B2 | 9/2017 | Nyalamadugu et al. | |
| 9,767,403 B2 | 9/2017 | Mullis et al. | |
| 9,767,404 B2 | 9/2017 | Mullis et al. | |
| 9,852,421 B2 | 12/2017 | Martinez De Velasco Cortina et al. | |
| 9,892,295 B2 | 2/2018 | Martinez De Velasco Cortina et al. | |
| 9,892,398 B2 | 2/2018 | Forster | |
| 10,083,385 B2 | 9/2018 | Martinez De Velasco Cortina et al. | |
| 10,102,685 B2 | 10/2018 | Nyalamadugu et al. | |
| 10,140,568 B2 | 11/2018 | Mullis et al. | |
| 10,147,034 B2 | 12/2018 | Mullis et al. | |
| 10,262,167 B2 | 4/2019 | Nyalamadugu et al. | |
| 10,262,253 B2 | 4/2019 | Mullis et al. | |
| 10,339,436 B2 | 7/2019 | Huhtasalo | |
| 10,388,079 B2 | 8/2019 | Nyalamadugu et al. | |
| 10,558,828 B2 | 2/2020 | Martinez De Velasco Cortina et al. | |
| 10,621,571 B2 | 4/2020 | Martinez De Velasco Cortina et al. | |
| 10,650,203 B1 | 5/2020 | Yamamoto et al. | |
| 10,671,904 B2 | 6/2020 | Mullis et al. | |

(56) References Cited

U.S. PATENT DOCUMENTS

| | | | |
|---|---|---|---|
| 10,679,115 B2 | 6/2020 | Huhtasalo | |
| 10,733,812 B2 | 8/2020 | Nyalamadugu et al. | |
| 10,769,510 B2 | 9/2020 | Martinez De Velasco Cortina et al. | |
| 10,885,418 B2 | 1/2021 | Nyalamadugu et al. | |
| 10,891,530 B2 | 1/2021 | Nyalamadugu et al. | |
| 10,929,835 B2 | 2/2021 | Nyalamadugu et al. | |
| 11,030,613 B2 | 6/2021 | Martinez De Velasco Cortina et al. | |
| 11,250,647 B2 | 2/2022 | Nyalamadugu et al. | |
| 11,282,067 B2 | 3/2022 | Nyalamadugu et al. | |
| 11,334,782 B2 | 5/2022 | Nyalamadugu et al. | |
| 11,403,506 B2 | 8/2022 | Nyalamadugu et al. | |
| 11,410,011 B2 | 8/2022 | Nyalamadugu et al. | |
| 11,429,828 B2 | 8/2022 | Martinez De Velasco Cortina et al. | |
| 11,734,670 B2 | 8/2023 | Nyalamadugu et al. | |
| 11,763,291 B2 | 9/2023 | Martinez De Velasco Cortina et al. | |
| 11,775,795 B2 | 10/2023 | Nyalamadugu et al. | |
| 11,809,937 B2 | 11/2023 | Nyalamadugu et al. | |
| 11,853,828 B2 | 12/2023 | Nyalamadugu et al. | |
| 11,948,035 B2 | 4/2024 | Nyalamadugu et al. | |
| 12,045,803 B2 | 7/2024 | Martinez De Velasco Cortina et al. | |
| 12,265,867 B2 | 4/2025 | Nyalamadugu et al. | |
| 12,321,800 B2 | 6/2025 | Nyalamadugu et al. | |
| 12,346,890 B2 | 7/2025 | Martinez De Velasco Cortina et al. | |
| 2001/0048361 A1 | 12/2001 | Mays et al. | |
| 2002/0160786 A1 | 10/2002 | Rietzler et al. | |
| 2003/0016136 A1 | 1/2003 | Harvey | |
| 2003/0116634 A1 | 6/2003 | Tanaka | |
| 2003/0132301 A1 | 7/2003 | Selker | |
| 2004/0089707 A1 | 5/2004 | Cortina et al. | |
| 2004/0188531 A1 | 9/2004 | Gengel et al. | |
| 2004/0189493 A1 | 9/2004 | Estus et al. | |
| 2005/0010478 A1 | 1/2005 | Gravelle | |
| 2005/0012616 A1 | 1/2005 | Forster et al. | |
| 2005/0038347 A1 | 2/2005 | Suzuki et al. | |
| 2005/0038736 A1 | 2/2005 | Saunders | |
| 2005/0186904 A1 | 8/2005 | Kowalski et al. | |
| 2005/0187882 A1 | 8/2005 | Sovio et al. | |
| 2005/0222961 A1 | 10/2005 | Staib et al. | |
| 2005/0237198 A1 | 10/2005 | Waldner et al. | |
| 2005/0242950 A1 | 11/2005 | Lindsay et al. | |
| 2005/0242957 A1 | 11/2005 | Lindsay et al. | |
| 2005/0279831 A1 | 12/2005 | Robinson et al. | |
| 2005/0289061 A1 | 12/2005 | Kulakowski et al. | |
| 2006/0054710 A1 | 3/2006 | Forster et al. | |
| 2006/0125603 A1 | 6/2006 | Nahear | |
| 2006/0132313 A1 | 6/2006 | Moskowitz | |
| 2006/0145851 A1 | 7/2006 | Posamentier | |
| 2006/0229978 A1 | 10/2006 | Popovic et al. | |
| 2006/0250250 A1 | 11/2006 | Youn | |
| 2006/0278704 A1 | 12/2006 | Saunders et al. | |
| 2007/0008140 A1 | 1/2007 | Saarisalo et al. | |
| 2007/0069858 A1 | 3/2007 | Kubo | |
| 2007/0075837 A1 | 4/2007 | Tuttle et al. | |
| 2007/0109101 A1 | 5/2007 | Colby | |
| 2007/0109208 A1 | 5/2007 | Turner | |
| 2007/0144662 A1 | 6/2007 | Armijo et al. | |
| 2007/0152829 A1 | 7/2007 | Lindsay et al. | |
| 2007/0171077 A1 | 7/2007 | Kawarizadeh | |
| 2007/0176779 A1 | 8/2007 | Braunstein | |
| 2007/0200681 A1 | 8/2007 | Colby | |
| 2007/0200682 A1 | 8/2007 | Colby | |
| 2007/0210923 A1 | 9/2007 | Butler et al. | |
| 2007/0254712 A1 | 11/2007 | Chitti | |
| 2007/0268140 A1 | 11/2007 | Tang et al. | |
| 2007/0279231 A1 | 12/2007 | Cheng et al. | |
| 2007/0285246 A1 | 12/2007 | Koyama | |
| 2007/0285256 A1 | 12/2007 | Batra | |
| 2007/0290856 A1 | 12/2007 | Martin | |
| 2008/0061151 A1 | 3/2008 | Phillips | |
| 2008/0084275 A1 | 4/2008 | Azevedo et al. | |
| 2008/0084310 A1 | 4/2008 | Nikitin et al. | |
| 2008/0122630 A1 | 5/2008 | Baba et al. | |
| 2008/0126929 A1 | 5/2008 | Bykov | |
| 2008/0147461 A1 | 6/2008 | Lee et al. | |
| 2008/0211675 A1 | 9/2008 | Forster et al. | |
| 2008/0218344 A1 | 9/2008 | Lazar | |
| 2008/0238679 A1 | 10/2008 | Rofougaran et al. | |
| 2008/0265039 A1 | 10/2008 | Skowronek et al. | |
| 2008/0308641 A1 | 12/2008 | Finn | |
| 2008/0314971 A1 | 12/2008 | Faith et al. | |
| 2009/0021379 A1 | 1/2009 | Zhu et al. | |
| 2009/0085750 A1 | 4/2009 | Waldner et al. | |
| 2009/0096611 A1 | 4/2009 | Jones | |
| 2009/0174365 A1 | 7/2009 | Lowenthal et al. | |
| 2009/0219158 A1 | 9/2009 | Nikitin et al. | |
| 2009/0231139 A1 | 9/2009 | Heurtier | |
| 2009/0262716 A1 | 10/2009 | Kawakami | |
| 2009/0322480 A1 | 12/2009 | Benedict et al. | |
| 2010/0026468 A1 | 2/2010 | Nyalamadugu et al. | |
| 2010/0052863 A1* | 3/2010 | Renfro, Jr. | G02B 6/4292 398/9 |
| 2010/0079289 A1 | 4/2010 | Brandt et al. | |
| 2010/0085213 A1 | 4/2010 | Turnock et al. | |
| 2010/0097280 A1 | 4/2010 | Zirbes et al. | |
| 2010/0112964 A1 | 5/2010 | Yi et al. | |
| 2010/0123010 A1 | 5/2010 | Sakama | |
| 2010/0194542 A1 | 8/2010 | Noakes et al. | |
| 2010/0230498 A1 | 9/2010 | Atherton | |
| 2010/0283690 A1 | 11/2010 | Artigue et al. | |
| 2010/0302012 A1* | 12/2010 | Roesner | G06K 19/0723 340/10.5 |
| 2011/0006959 A1 | 1/2011 | Menko et al. | |
| 2011/0013491 A1 | 1/2011 | Fujisawa | |
| 2011/0037541 A1 | 2/2011 | Johnson et al. | |
| 2011/0078933 A1 | 4/2011 | Lukawitz et al. | |
| 2011/0084888 A1 | 4/2011 | Nishioka et al. | |
| 2011/0137773 A1 | 6/2011 | Davis, III et al. | |
| 2011/0156893 A1* | 6/2011 | Hwang | B60R 1/12 340/442 |
| 2011/0309931 A1 | 12/2011 | Rose | |
| 2012/0019363 A1 | 1/2012 | Fein | |
| 2012/0024947 A1 | 2/2012 | Naelon | |
| 2012/0032781 A1 | 2/2012 | Moon et al. | |
| 2012/0111950 A1 | 5/2012 | Worrall et al. | |
| 2012/0161937 A1 | 6/2012 | Chen | |
| 2012/0217928 A1 | 8/2012 | Kulidjian et al. | |
| 2012/0235870 A1 | 9/2012 | Forster | |
| 2012/0248929 A1 | 10/2012 | Fish et al. | |
| 2012/0280044 A1 | 11/2012 | Mullis et al. | |
| 2012/0280045 A1 | 11/2012 | Mullis et al. | |
| 2012/0287249 A1 | 11/2012 | Choo et al. | |
| 2012/0323767 A1 | 12/2012 | Michael | |
| 2013/0018705 A1 | 1/2013 | Heath et al. | |
| 2013/0103519 A1 | 4/2013 | Kountotsis et al. | |
| 2013/0105584 A1 | 5/2013 | Forster | |
| 2013/0119135 A1 | 5/2013 | Gauthier et al. | |
| 2013/0120117 A1 | 5/2013 | Nyalamadugu et al. | |
| 2013/0272580 A1 | 10/2013 | Karel et al. | |
| 2013/0332353 A1 | 12/2013 | Aidasani et al. | |
| 2014/0025520 A1 | 1/2014 | Mardikar et al. | |
| 2014/0074566 A1 | 3/2014 | McCoy et al. | |
| 2014/0100925 A1 | 4/2014 | Popescu et al. | |
| 2014/0175177 A1 | 6/2014 | Mullis et al. | |
| 2014/0180773 A1 | 6/2014 | Zafiroglu et al. | |
| 2014/0209693 A1 | 7/2014 | Nyalamadugu et al. | |
| 2014/0229246 A1 | 8/2014 | Ghaffari | |
| 2014/0232518 A1 | 8/2014 | Stoehr | |
| 2014/0278841 A1 | 9/2014 | Natinsky | |
| 2014/0313057 A1 | 10/2014 | Kokal et al. | |
| 2014/0351027 A1 | 11/2014 | Gravelle et al. | |
| 2014/0374492 A1 | 12/2014 | Mullis et al. | |
| 2015/0021389 A1 | 1/2015 | Gravelle | |
| 2015/0039494 A1 | 2/2015 | Sinton et al. | |
| 2015/0048159 A1 | 2/2015 | Martinez De Velasco Cortina et al. | |
| 2015/0062340 A1 | 3/2015 | Datta et al. | |
| 2015/0070181 A1 | 3/2015 | Fadell et al. | |

(56) References Cited

U.S. PATENT DOCUMENTS

| | | |
|---|---|---|
| 2015/0077297 A1 | 3/2015 | Forster |
| 2015/0088617 A1 | 3/2015 | Geist et al. |
| 2015/0090798 A1 | 4/2015 | Pachler et al. |
| 2015/0115043 A1 | 4/2015 | Mullis et al. |
| 2015/0135336 A1 | 5/2015 | Arasavelli et al. |
| 2015/0294210 A1 | 10/2015 | Martinez De Velasco Cortina et al. |
| 2015/0339500 A1 | 11/2015 | Nyalamadugu et al. |
| 2016/0275481 A1 | 9/2016 | Martinez De Velasco Cortina et al. |
| 2016/0342821 A1 | 11/2016 | Nyalamadugu et al. |
| 2016/0342883 A1 | 11/2016 | Huhtasalo |
| 2016/0343175 A1 | 11/2016 | Nyalamadugu et al. |
| 2017/0032239 A1 | 2/2017 | Mullis et al. |
| 2017/0048280 A1 | 2/2017 | Logue et al. |
| 2017/0177988 A1 | 6/2017 | Mullis et al. |
| 2017/0195009 A1 | 7/2017 | Nagai |
| 2018/0005098 A1 | 1/2018 | Mullis et al. |
| 2018/0005099 A1 | 1/2018 | Mullis et al. |
| 2018/0108006 A1 | 4/2018 | Martinez De Velasco Cortina et al. |
| 2018/0260676 A1 | 9/2018 | Nyalamadugu et al. |
| 2018/0276520 A1 | 9/2018 | Mullis et al. |
| 2019/0034775 A1 | 1/2019 | Martinez De Velasco Cortina et al. |
| 2019/0035169 A1 | 1/2019 | Nyalamadugu et al. |
| 2019/0220724 A1 | 7/2019 | Huhtasalo |
| 2019/0244070 A1 | 8/2019 | Mullis et al. |
| 2019/0371083 A1 | 12/2019 | Nyalamadugu et al. |
| 2020/0074258 A1 | 3/2020 | Nyalamadugu et al. |
| 2020/0074261 A1 | 3/2020 | Nyalamadugu et al. |
| 2020/0143219 A1 | 5/2020 | Nyalamadugu et al. |
| 2020/0175497 A1 | 6/2020 | Nyalamadugu et al. |
| 2020/0234280 A1 | 7/2020 | Martinez De Velasco Cortina et al. |
| 2020/0364947 A1 | 11/2020 | Nyalamadugu et al. |
| 2020/0401864 A1 | 12/2020 | Martinez De Velasco Cortina et al. |
| 2021/0125016 A1 | 4/2021 | Nyalamadugu et al. |
| 2021/0125019 A1 | 4/2021 | Nyalamadugu et al. |
| 2021/0166216 A1 | 6/2021 | Nyalamadugu et al. |
| 2021/0287203 A1 | 9/2021 | Martinez De Velasco Cortina et al. |
| 2022/0172520 A1 | 6/2022 | Nyalamadugu et al. |
| 2022/0207515 A1 | 6/2022 | Nyalamadugu et al. |
| 2022/0253660 A1 | 8/2022 | Nyalamadugu et al. |
| 2022/0343131 A1 | 10/2022 | Nyalamadugu et al. |
| 2022/0374672 A1 | 11/2022 | Nyalamadugu et al. |
| 2023/0306227 A1 | 9/2023 | Nyalamadugu et al. |
| 2023/0401560 A1 | 12/2023 | Martinez De Velasco Cortina et al. |
| 2024/0086675 A1 | 3/2024 | Nyalamadugu et al. |
| 2024/0249103 A1 | 7/2024 | Nyalamadugu et al. |
| 2024/0370847 A1 | 11/2024 | Martinez De Velasco Cortina et al. |
| 2025/0225359 A1 | 7/2025 | Nyalamadugu et al. |
| 2025/0328892 A1 | 10/2025 | Martinez De Velasco Cortina et al. |

FOREIGN PATENT DOCUMENTS

| | | | |
|---|---|---|---|
| CN | 101809594 A | 8/2010 | |
| CN | 102129596 A | 7/2011 | |
| CN | 102332634 A | 1/2012 | |
| CN | 102999776 A | 3/2013 | |
| CN | 103020693 A | 4/2013 | |
| DE | 19742126 A1 | 3/1999 | |
| EP | 1087332 A1 | 3/2001 | |
| EP | 1087332 B1 | 2/2008 | |
| EP | 2056234 A2 | 5/2009 | |
| EP | 2230174 A2 | 9/2010 | |
| EP | 2472289 A1 | 7/2012 | |
| EP | 2230174 A3 | 4/2013 | |
| EP | 2056234 B1 | 8/2016 | |
| FR | 2757952 A1 | 7/1998 | |
| FR | 2757952 B1 | 3/1999 | |
| JP | S5464011 A | 5/1979 | |
| JP | S5464011 U | 5/1979 | |
| JP | 2005089707 A | 4/2005 | |
| JP | 2005182194 A | 7/2005 | |
| JP | 5464011 B2 | 4/2014 | |
| KR | 20110116886 A | 10/2011 | |
| KR | 20140094309 A | 7/2014 | |
| MX | 2017012923 A | 8/2018 | |
| WO | 03079487 A1 | 9/2003 | |
| WO | 2008074050 A1 | 6/2008 | |
| WO | 2009100005 A2 | 8/2009 | |
| WO | 2011146492 A2 | 11/2011 | |
| WO | 2012025787 A1 | 3/2012 | |
| WO | 2012154605 A2 | 11/2012 | |
| WO | 2011146492 A3 | 12/2012 | |
| WO | 2012163452 A1 | 12/2012 | |
| WO | 2015023805 A1 | 2/2015 | |
| WO | 2016164924 A2 | 10/2016 | |
| WO | 2016187589 A1 | 11/2016 | |
| WO | 2017023882 A1 | 2/2017 | |
| WO | 2017023885 A1 | 2/2017 | |
| WO | 2020097392 A1 | 5/2020 | |

OTHER PUBLICATIONS

Declaration of Bruce Roesner, Inter Partes Review of U.S. Pat. No. 8,944,337, IPR Case No. IPR2016-01763, Exhibit No. 1049, exhibit filing date Nov. 17, 2017, pp. 1-93.

Deposition of Jim Fischer, IPR Case No. 2016-01763, Sep. 8, 2017, Inter Partes Review of U.S. Pat. No. 8,944,337, IPR Case No. IPR2016-01763, Exhibit No. 1027, exhibit filing date Sep. 21, 2017, pp. 1-364.

EPC based RFID Item Level Tagging, Inter Partes Review of U.S. Pat. No. 8,944,337, IPR Case No. IPR2016-01763, Exhibit No. 2013, exhibit filing date Jun. 21, 2017, pp. 1-56.

Finkenzeller, Klaus, Excerpts from RFID Handbook, Inter Partes Review of U.S. Pat. No. 8,944,337, IPR Case No. IPR2016-01763, Exhibit No. 2058, exhibit filing date Dec. 6, 2017, pp. 1-24.

Fischer Declaration ISO Patent Owners Contingent Motion to Amend Claims, Inter Partes Review of U.S. Pat. No. 8,944,337, IPR Case No. IPR2016-01763, Exhibit No. 2029, exhibit filing date Jun. 21, 2017, pp. 1-51.

Fischer Declaration ISO Patent Owners Preliminary Response, Inter Partes Review of U.S. Pat. No. 8,944,337, IPR Case No. IPR2016-01763, Exhibit No. 2002, exhibit filing date Dec. 22, 2016, pp. 1-124.

Fischer Declaration ISO Patent Owners Response to Petition, Inter Partes Review of U.S. Pat. No. 8,944,337, IPR Case No. IPR2016-01763, Exhibit No. 2028, exhibit filing date Jun. 21, 2017, pp. 1-87.

Fischer Deposition Exhibit 1026—Handwritten Diagram, Inter Partes Review of U.S. Pat. No. 8,944,337, IPR Case No. IPR2016-01763, Exhibit No. 1026, exhibit filing date Sep. 21, 2017, p. 1.

Instructables: Pull Out Birthday Card, Inter Partes Review of U.S. Pat. No. 8,944,337, IPR Case No. IPR2016-01763, Exhibit No. 1030, exhibit filing date Sep. 21, 2017, pp. 1-6.

International Search Report and Written Opinion for PCT/US2016/033636 mailed on Aug. 30, 2016, 12 pages.

International Search Report and Written Opinion for PCT/US2016/045066 dated Nov. 11, 2016, 11 pages.

International Search Report and Written Opinion for PCT/US2016/045069 mailed Oct. 21, 2016, 9 pages.

Johnson et al., Introductory Electric Circuit Analysis, Inter Partes Review of U.S. Pat. No. 8,944,337, IPR Case No. IPR2016-01763, Exhibit No. 2018, exhibit filing date Jun. 21, 2017, pp. 1-12.

Kraus, John D., Excerpts from Antennas 2nd Ed., Inter Partes Review of U.S. Pat. No. 8,944,337, IPR Case No. IPR2016-01763, Exhibit No. 2051, exhibit filing date Oct. 19, 2017, pp. 1-8.

Lehpamer, Harvey, Excerpts from RFID Design Principles, Inter Partes Review of U.S. Pat. No. 8,944,337, IPR Case No. IPR2016-01763, Exhibit No. 2057, exhibit filing date Dec. 6, 2017, pp. 1-14.

Malmstadt et al., Electronics for Scientists: Principles and Experiments for Those Who Use Instruments, Inter Partes Review of U.S.

(56)          References Cited

OTHER PUBLICATIONS

Pat. No. 8,944,337, IPR Case No. IPR2016-01763, Exhibit No. 2019, exhibit filing date Jun. 21, 2017, pp. 1-3.

Motion to Amend Claims, Inter Partes Review of U.S. Pat. No. 8,944,337, IPR Case No. IPR2016-01763, Paper No. 13, filing date Jun. 21, 2017, pp. 1-35.

Pozar, David M., Excerpts from Microwave Engineering 4th Ed., Inter Partes Review of U.S. Pat. No. 8,944,337, IPR Case No. IPR2016-01763, Exhibit No. 2052, exhibit filing date Oct. 19, 2017, pp. 1-3.

Petition, Inter Partes Review of U.S. Pat. No. 8,944,337, IPR Case No. IPR2016-01763, Paper No. 1, filing date Sep. 9, 2016, pp. 1-87.

Petitioner's Amended Appendix of Exhibits, Inter Partes Review of U.S. Pat. No. 8,944,337, IPR Case No. IPR2016-01763, Paper No. 18, filing date Sep. 21, 2017, pp. 1-5.

Petitioner's Motion to Exclude, Inter Partes Review of U.S. Pat. No. 8,944,337, IPR Case No. IPR2016-01763, Paper No. 38, filing date Dec. 6, 2017, pp. 1-14.

Petitioner's Opposition to Patent Owner's Contingent Motion to Amend, Inter Partes Review of U.S. Pat. No. 8,944,337, IPR Case No. IPR2016-01763, Paper No. 17, filing date Sep. 21, 2017, pp. 1-32.

Petitioner's Reply to Patent Owner's Response, Inter Partes Review of U.S. Pat. No. 8,944,337, IPR Case No. IPR2016-01763, Paper No. 16, filing date Sep. 21, 2017, pp. 1-39.

Petitioner's Sur-Reply to Patent Owner's Reply to Petitioner's Opposition to Patent Owner's Contingent Motion to Amend, Inter Partes Review of U.S. Pat. No. 8,944,337, IPR Case No. IPR2016-01763, Paper No. 31, filing date Nov. 17, 2017, pp. 1-18.

Poynting, Universal Modem-to-Antenna Adaptor, Inter Partes Review of U.S. Pat. No. 8,944,337, IPR Case No. IPR2016-01763, Exhibit No. 2004, exhibit filing date Dec. 22, 2016, pp. 1-2.

Preliminary Response, Inter Partes Review of U.S. Pat. No. 8,944,337, IPR Case No. IPR2016-01763, Paper No. 7, filing date Dec. 22, 2016, pp. 1-62.

Reply to Petitioner's Opposition to Contingent Motion to Amend, Inter Partes Review of U.S. Pat. No. 8,944,337, IPR Case No. IPR2016-01763, Paper No. 20, filing date Oct. 19, 2017, pp. 1-19.

Response to IPR, Inter Partes Review of U.S. Pat. No. 8,944,337, IPR Case No. IPR2016-01763, Paper No. 12, filing date Jun. 21, 2017, pp. 1-63.

Supplemental Fischer Declaration ISO PO's Motion to Amend, Inter Partes Review of U.S. Pat. No. 8,944,337, IPR Case No. IPR2016-01763, Exhibit No. 2044, exhibit filing date Oct. 19, 2017, pp. 1-36.

U.S. Pat. No. 7,782,206 B2, to Burnett et al., Inter Partes Review of U.S. Pat. No. 8,944,337, IPR Case No. IPR2016-01763, Exhibit No. 2021, exhibit filing date Jun. 21, 2017, pp. 1-10.

U.S. Pat. No. 8,944,337, to Mullis et al., Inter Partes Review of U.S. Pat. No. 8,944,337, IPR Case No. IPR2016-01763, Exhibit No. 1004, exhibit filing date Sep. 9, 2016, pp. 1-17.

U.S. Pat. No. 9,582,746, to Mullis et al., Inter Partes Review of U.S. Pat. No. 8,944,337, IPR Case No. IPR2016-01763, Exhibit No. 1032, exhibit filing date Sep. 21, 2017, pp. 1-17.

United States Patent and Trademark Office. Before the Patent Trial and Appeal Board. *Kapsch Trafficcom IVHS Inc.*, Petitioner, V. *Neology, Inc.*, Patent Owner. Case IPR2016-01763. U.S. Pat. No. 8,944,337 B2. "Final Written Decision." Entered Mar. 20, 2018. 60 pages.

International Search Report and Written Opinion dated Apr. 8, 2020 for corresponding application PCT/US2019/060354 (11 pages).

Extended European Search Report for EP Application No. 21165992.5 dated Aug. 5, 2021 (6 pages).

Communication pursuant to Article 94(3) dated Jun. 3, 2022 in related EP Application No. 21165992.5, in 4 pages.

U.S. Pat. No. 674,284, to G.A. Sachs, issued May 14, 1901, Inter Partes Review of U.S. Pat. No. 8,944,337, IPR Case No. IPR2016-01763, Exhibit No. 1015, exhibit filing date Sep. 9, 2016, pp. 1-6.

Stein, Jess (Editor), Excerpt from The Random House Dictionary of the English Language, 1966, Inter Partes Review of U.S. Pat. No.

8,944,337, IPR Case No. IPR2016-01763, Exhibit No. 1050, exhibit filing date Nov. 17, 2017, pp. 1-5.

Mazda, F.F., Discrete Electronics Components, 1981, Inter Partes Review of U.S. Pat. No. 8,944,337, IPR Case No. IPR2016-01763, Exhibit No. 2031, exhibit filing date Jun. 21, 2017, pp. 1-11.

U.S. Pat. No. 5,659,324, to Taniguchi et al., issued Aug. 19, 1997, Inter Partes Review of U.S. Pat. No. 8,944,337, IPR Case No. IPR2016-01763, Exhibit No. 2007, exhibit filing date Dec. 22, 2016, pp. 1-79.

Finkenzeller, Rfid Handbook Fundamentals and Applications in Contactless Smart Cards and Identification, 2nd Ed. 1999 Copyright pages and Chapters 2-4, Inter Partes Review of U.S. Pat. No. 8,944,337, IPR Case No. IPR2016-01763, Exhibit No. 2011, exhibit filing date Dec. 22, 2016, pp. 1-154.

Holt et al., Physics 1999, Inter Partes Review of U.S. Pat. No. 8,944,337, IPR Case No. IPR2016-01763, Exhibit No. 2032, exhibit filing date Jun. 21, 2017, pp. 1-4.

U.S. Pat. No. 6,121,544, to Petsinger (issued Sep. 19, 2000), Inter Partes Review of U.S. Pat. No. 8,944,337, IPR Case No. IPR2016-01763, Exhibit No. 1051, exhibit filing date Nov. 17, 2017, pp. 1-16.

Excerpt from Merriam-Webster's Collegiate Dictionary (10th ed. 2002), Inter Partes Review of U.S. Pat. No. 8,944,337, IPR Case No. IPR2016-01763, Exhibit No. 1029, exhibit filing date Sep. 21, 2017, pp. 1-8.

PCT International Publication No. 2003/079487 A1, to Roshchupkin, Inter Partes Review of U.S. Pat. No. 8,944,337, IPR Case No. IPR2016-01763, Exhibit No. 2003, exhibit filing date Dec. 22, 2016, pp. 1-38.

Kaplan, Steven M., Excerpt from Wiley Electrical and Electronics Engineering Dictionary (2004), Inter Partes Review of U.S. Pat. No. 8,944,337, IPR Case No. IPR2016-01763, Exhibit No. 1028, exhibit filing date Sep. 21, 2017, pp. 1-4.

U.S. Patent Application Publication No. 2004/0242285 A1, to Farshi, Pub. Date Dec. 2, 2004, Inter Partes Review of U.S. Pat. No. 8,944,337, IPR Case No. IPR2016-01763, Exhibit No. 2006, exhibit filing date Dec. 22, 2016, pp. 1-9.

Jamaluddin et al., Microstrip Dipole Antenna Analysis with Different Width and Length at 2.4 GHZ, Dec. 2005, Inter Partes Review of U.S. Pat. No. 8,944,337, IPR Case No. IPR2016-01763, Exhibit No. 2047, exhibit filing date Oct. 19, 2017, pp. 1-4.

U.S. Patent Application Publication No. 2005/0134461 A1, to Gelbman et al., Inter Partes Review of U.S. Pat. No. 8,944,337, IPR Case No. IPR2016-01763, Exhibit No. 2022, exhibit filing date Jun. 21, 2017, pp. 1-27.

U.S. Pat. No. 7,120,987, to Peikang Liu et al., issued Oct. 17, 2006, Inter Partes Review of U.S. Pat. No. 8,944,337, IPR Case No. IPR2016-01763, Exhibit No. 1018, exhibit filing date Sep. 9, 2016, pp. 1-15.

Boylestad, Robert L., Excerpt from Introductory Circuit Analysis, 2007, Inter Partes Review of U.S. Pat. No. 8,944,337, IPR Case No. IPR2016-01763, Exhibit No. 1053, exhibit filing date Nov. 17, 2017, pp. 1-4.

U.S. Patent Application Publication No. 2007/0144662, to Armijo et al., Inter Partes Review of U.S. Pat. No. 8,944,337, IPR Case No. IPR2016-01763, Exhibit No. 1016, exhibit filing date Sep. 9, 2016, pp. 1-13.

U.S. Patent Application Publication No. 2007/0290858, to Janke et al., Inter Partes Review of U.S. Pat. No. 8,944,337, IPR Case No. IPR2016-01763, Exhibit No. 1008, exhibit filing date Sep. 9, 2016, pp. 1-5.

PCT International Publication No. 2008/074050 A1, to Peter Samuel Atherton, Inter Partes Review of U.S. Pat. No. 8,944,337, IPR Case No. IPR2016-01763, Exhibit No. 1006, exhibit filing date Sep. 9, 2016, pp. 1-21.

PCT International Publication No. 2008/074050 A1, to Peter Samuel Atherton, Inter Partes Review of U.S. Pat. No. 8,944,337, IPR Case No. IPR2016-01763, Exhibit No. 2014, exhibit filing date Jun. 21, 2017, pp. 1-21.

U.S. Pat. No. 7,361,251, to Green et al., issued Apr. 22, 2008, Inter Partes Review of U.S. Pat. No. 8,944,337, IPR Case No. IPR2016-01763, Exhibit No. 1017, exhibit filing date Sep. 9, 2016, pp. 1-28.

(56) References Cited

OTHER PUBLICATIONS

U.S. Pat. No. 7,437,148 B1, to Vaghi et al., issued Oct. 14, 2008, Inter Partes Review of U.S. Pat. No. 8,944,337, IPR Case No. IPR2016-01763, Exhibit No. 2005, exhibit filing date Dec. 22, 2016, pp. 1-28.

U.S. Pat. No. 7,460,018, to Yuki Kubo, issued Dec. 2, 2008, Inter Partes Review of U.S. Pat. No. 8,944,337, IPR Case No. IPR2016-01763, Exhibit No. 1007, exhibit filing date Sep. 9, 2016, pp. 1-13.

International Search Report and Written Opinion for PCT/US2009/032840 mailed on May 26, 2009, 6 pages.

Reference Designer Chapter 4.1 Impedance of Capacitor 2009, Inter Partes Review of U.S. Pat. No. 8,944,337, IPR Case No. IPR2016-01763, Exhibit No. 2009, exhibit filing date Dec. 22, 2016, pp. 1-2.

U.S. Pat. No. 7,571,694, to Rick Boerner, issued Aug. 11, 2009, Inter Partes Review of U.S. Pat. No. 8,944,337, IPR Case No. IPR2016-01763, Exhibit No. 1013, exhibit filing date Sep. 9, 2016, pp. 1-22.

European Patent No. 2230174, to Yoshizaki, issued Sep. 22, 2010, Inter Partes Review of U.S. Pat. No. 8,944,337, IPR Case No. IPR2016-01763, Exhibit No. 1014, exhibit filing date Sep. 9, 2016, pp. 1-23.

Fischer Deposition Exhibit 1025—U.S. Patent Application Publication No. US 2010/0283690 A1 to Artigue et al., Inter Partes Review of U.S. Pat. No. 8,944,337, IPR Case No. IPR2016-01763, Exhibit No. 1025, exhibit filing date Sep. 21, 2017, pp. 1-12.

U.S. Patent Application Publication No. 2010/0283690, to Artigue et al., Inter Partes Review of U.S. Pat. No. 8,944,337, IPR Case No. IPR2016-01763, Exhibit No. 1020, exhibit filing date Sep. 9, 2016, pp. 1-12.

U.S. Patent Application Publication No. 2010/0302012, to Bruce B. Roesner, Inter Partes Review of U.S. Pat. No. 8,944,337, IPR Case No. IPR2016-01763, Exhibit No. 1009, exhibit filing date Sep. 9, 2016, pp. 1-14.

European Search Report issued in European Patent Application No. 09708616.9 on May 9, 2011 (9 pages).

International Search Report received in corresponding International Application No. PCT/US2012/036654, mailed on Nov. 16, 2012, 5 pages.

U.S. Patent Application Publication No. 2012/0280045 A1, to Mullis et al., Inter Partes Review of U.S. Pat. No. 8,944,337, IPR Case No. IPR2016-01763, Exhibit No. 2025, exhibit filing date Jun. 21, 2017, pp. 1-17.

Glossary of RFID Terms May 22, 2013, Inter Partes Review of U.S. Pat. No. 8,944,337, IPR Case No. IPR2016-01763, Exhibit No. 2033, exhibit filing date Jun. 21, 2017, pp. 1-3.

Keyrouz et al., Novel Empirical Equations to Calculate the Impedance of a Strip Dipole Antenna, Dec. 2013, Inter Partes Review of U.S. Pat. No. 8,944,337, IPR Case No. IPR2016-01763, Exhibit No. 2046, exhibit filing date Oct. 19, 2017, pp. 1-4.

U.S. Pat. No. 8,350,673, to Nyalamadugu et al., issued Jan. 8, 2013, Inter Partes Review of U.S. Pat. No. 8,944,337, IPR Case No. IPR2016-01763, Exhibit No. 1012, exhibit filing date Sep. 9, 2016, pp. 1-9.

U.S. Pat. No. 8,416,079 B2, to Roesner, issued on Apr. 9, 2013, Inter Partes Review of U.S. Pat. No. 8,944,337, IPR Case No. IPR2016-01763, Exhibit No. 2012, exhibit filing date Dec. 22, 2016, pp. 1-18.

U.S. Pat. No. 8,604,995, to Hammad (issued Dec. 10, 2013), Inter Partes Review of U.S. Pat. No. 8,944,337, IPR Case No. IPR2016-01763, Exhibit No. 1052, exhibit filing date Nov. 17, 2017, pp. 1-15.

Excerpt from '337 file history: Apr. 4, 2014 Non-Final Rejection, Inter Partes Review of U.S. Pat. No. 8,944,337, IPR Case No. IPR2016-01763, Exhibit No. 1010, exhibit filing date Sep. 9, 2016, pp. 1-5.

Excerpt from '337 file history: Nov. 14, 2014 Notice of Allowance, Inter Partes Review of U.S. Pat. No. 8,944,337, IPR Case No. IPR2016-01763, Exhibit No. 1019, exhibit filing date Sep. 9, 2016, pp. 1-8.

Excerpt from '337 file history: Nov. 4, 2014 Response After Final Action, Inter Partes Review of U.S. Pat. No. 8,944,337, IPR Case No. IPR2016-01763, Exhibit No. 1011, exhibit filing date Sep. 9, 2016, pp. 1-9.

U.S. Patent Application Publication No. 2014/0175177 A1, to Mullis et al., Inter Partes Review of U.S. Pat. No. 8,944,337, IPR Case No. IPR2016-01763, Exhibit No. 2026, exhibit filing date Jun. 21, 2017, pp. 1-16.

European Search Report for EP Application No. 12782498.5 dated Mar. 12, 2015 (6 pages).

Lee et al., Designing Antenna Booster Cases for Mobile Phones using Capacitive Coupling Techniques 2015, Inter Partes Review of U.S. Pat. No. 8,944,337, IPR Case No. IPR2016-01763, Exhibit No. 2008, exhibit filing date Dec. 22, 2016, pp. 1-2.

372 Application, to Mullis et al., Inter Partes Review of U.S. Pat. No. 8,944,337, IPR Case No. IPR2016-01763, Exhibit No. 2024, exhibit filing date Jun. 21, 2017, pp. 1-20.

586 Application, to Mullis et al., Inter Partes Review of U.S. Pat. No. 8,944,337, IPR Case No. IPR2016-01763, Exhibit No. 2023, exhibit filing date Jun. 21, 2017, pp. 1-17.

Balanis, Constantine A., Excerpts from Antenna Theory, Inter Partes Review of U.S. Pat. No. 8,944,337, IPR Case No. IPR2016-01763, Exhibit No. 2056, exhibit filing date Dec. 6, 2017, pp. 1-4.

Boylestad, Introductory Circuit Analysis, Inter Partes Review of U.S. Pat. No. 8,944,337, IPR Case No. IPR2016-01763, Exhibit No. 2016, exhibit filing date Jun. 21, 2017, pp. 1-3.

Boylestad, Introductory Circuit Analysis, Inter Partes Review of U.S. Pat. No. 8,944,337, IPR Case No. IPR2016-01763, Exhibit No. 2020, exhibit filing date Jun. 21, 2017, pp. 1-3.

Clifford, How to Read Circuit Diagrams and Electronic Graphs, Inter Partes Review of U.S. Pat. No. 8,944,337, IPR Case No. IPR2016-01763, Exhibit No. 2015, exhibit filing date Jun. 21, 2017, pp. 1-8.

Declaration of Bruce Roesner in Support of Petition, Inter Partes Review of U.S. Pat. No. 8,944,337, IPR Case No. IPR2016-01763, Exhibit No. 1001, exhibit filing date Sep. 9, 2016, pp. 1-89.

Cadamuro M., "A Complete Range Of Dual Frequency RFID Cards From SAG," Feb. 21, 2012, 02 Pages, [Retrieved On Dec. 15, 2020] Retrieved From URL: http://www.veryfields.net/dual-frequency-rfid-cards-uhf-hf-lf-sag.

Communication Pursuant to Article 94(3) EPC for European Application 20180852.4, dated Nov. 30, 2023, 5 Pages.

Communication Pursuant to Article 94(3) EPC for European Application No. 14836230.4, dated Jul. 2, 2019, 06 Pages.

Communication Pursuant to Article 94(3) EPC for European Application No. 16777505.5, dated May 14, 2019, 04 Pages.

Communication Pursuant to Article 94(3) EPC for European Application No. 20180852.4, dated Jan. 21, 2026, 5 Pages.

Extended European Search Report for European Application No. 14836230.4, dated Jan. 4, 2017, 7 Pages.

Extended European Search Report for European Application No. 16777505.5, dated Sep. 26, 2018, 7 Pages.

Extended European Search Report for European Application No. 16797416.1, dated Apr. 12, 2019, 08 Pages.

Extended European Search Report for European Application No. 16833704.6, dated Mar. 28, 2019, 9 Pages.

Extended European Search Report for European Application No. 16833707.9, dated Feb. 18, 2019, 05 Pages.

Extended European Search Report for European Application No. 18213230.8, dated Jul. 1, 2019, 6 Pages.

Extended European Search Report for European Application No. 19199371.6, dated Nov. 20, 2019, 8 Pages.

Extended European Search Report for European Application No. 19881026.9, dated Jul. 6, 2022, 07 Pages.

Extended European Search Report for European Application No. 20180852.4, dated Jan. 13, 2021, 10 Pages.

Extended European Search Report for European Application No. 21201886.5, dated Jan. 17, 2022, 11 Pages.

Final Office Action for U.S. Appl. No. 17/012,610, dated Nov. 4, 2021, 12 Pages.

Fischer Deposition Exhibit 1021—Annotated Excerpt from U.S. Pat. No. 8,944,337, Issued on Feb. 3, 2015, Inter Partes Review of

(56)          References Cited

OTHER PUBLICATIONS

U.S. Pat. No. 8,944,337, IPR Case No. IPR2016-01763, Exhibit No. 1021, exhibit filing date Sep. 21, 2017, 1 page.
Fischer Deposition Exhibit 1022—Annotated Excerpt from U.S. Pat. No. 8,944,337, Issued on Feb. 3, 2015, Inter Partes Review of U.S. Pat. No. 8,944,337, IPR Case No. IPR2016-01763, Exhibit No. 1022, exhibit filing date Sep. 21, 2017, 1 page.
Fischer Deposition Exhibit 1023—Annotated Excerpt from U.S. Pat. No. 8,944,337, Issued on Feb. 3, 2015, Inter Partes Review of U.S. Pat. No. 8,944,337, IPR Case No. IPR2016-01763, Exhibit No. 1023, exhibit filing date Sep. 21, 2017, 1 page.
Fischer Deposition Exhibit 1024—Annotated Excerpt from U.S. Pat. No. 8,944,337, Issued on Feb. 3, 2015, Inter Partes Review of U.S. Pat. No. 8,944,337, IPR Case No. IPR2016-01763, Exhibit No. 1024, exhibit filing date Sep. 21, 2017, 1 page.
Fischer Deposition Exhibit 1035A: Model, Inter Partes Review of U.S. Pat. No. 8,944,337, IPR Case No. PR2016-01763, Exhibit No. 1035A, exhibit filing date Nov. 17, 2017, 01 Page.
International Preliminary Report on Patentability for International Application No. PCT/US2019/060354, dated May 20, 2021, 08 Pages.

International Search Report and Written Opinion for International Application No. PCT/US2014/050973, dated Oct. 29, 2014, 06 Pages.
Non-Final Office Action for U.S. Appl. No. 17/012,610, dated Jun. 28, 2021, 25 Pages.
Non-Final Office Action for U.S. Appl. No. 17/143,021, dated Jan. 18, 2022, 17 Pages.
Non-Final Office Action for U.S. Appl. No. 17/175,345, dated Aug. 25, 2021, 17 Pages.
Non-Final Office Action for U.S. Appl. No. 17/328,562, dated Sep. 15, 2022, 28 Pages.
Non-Final Office Action for U.S. Appl. No. 17/698,506, dated Nov. 14, 2022, 22 Pages.
Non-Final Office Action for U.S. Appl. No. 17/883,320, dated Dec. 20, 2022, 10 Pages.
Office Action for Mexican Application No. MX/a/2017/012923, dated May 17, 2022, 05 Pages.
Reference Designer Chapter 4.1 Parallel Plate Capacitor 2009, Inter Partes Review of U.S. Pat. No. 8,944,337, Case No. IPR2016-01763, Exhibit No. 2010, Exhibit Filed Dec. 22, 2016, 1 page.
Written Opinion for International Application No. PCT/US2012/036654, dated Nov. 16, 2012, 07 Pages.
Written Opinion for International Application No. PCT/US2016/026983, dated Aug. 19, 2016, 04 Pages.

* cited by examiner

1200

1230

1210

1220

1608

1612

1610

1602

1604

1606

RFID SWITCH TAG

RELATED APPLICATION INFORMATION

This patent application is a continuation of U.S. application Ser. No. 18/592,463, filed Feb. 29, 2024, which is a continuation of U.S. application Ser. No. 18/205,406, filed Jun. 2, 2023, which is a continuation-in-part of U.S. application Ser. No. 17/728,115, filed Apr. 25, 2022, now U.S. Pat. No. 11,775,795, issued Oct. 10, 2003, entitled "Detachable Radio Frequency Identification Switch Tag,", which is a continuation of U.S. application Ser. No. 17/142,159, filed Jan. 5, 2021, entitled "Detachable Radio Frequency Identification Switch Tag," now U.S. Pat. No. 11,334,782, which is a continuation of application U.S. application Ser. No. 16/677,663, filed Nov. 7, 2019, now U.S. Pat. No. 10,885,418 issued Jan. 5, 2021 entitled "Detachable Radio Frequency Identification Switch Tag," which claims the benefit under 35 U.S.C. § 119 (e) to U.S. Provisional Application No. 62/757,018, filed Nov. 7, 2018, and is a Continuation-in-Part of U.S. Non-Provisional application Ser. No. 16/384,643, filed Apr. 15, 2019, now U.S. Pat. No. 10,671,904 issued Jun. 2, 2020 entitled "RFID Switch Tag," which is a continuation application of U.S. application Ser. No. 15/996,345, filed Jun. 1, 2018, now U.S. Pat. No. 10,262,253 issued on Apr. 16, 2016, entitled "RFID Switch Tag,", which, in turn, is a continuation application of U.S. application Ser. No. 15/705,198, entitled "RFID Switch Tag," filed Sep. 14, 2017, now U.S. Pat. No. 10,147,034 issued on Dec. 4, 2018, which is a continuation application of U.S. application Ser. No. 15/445,731, entitled "RFID Switch Tag," filed Feb. 28, 2017, now U.S. Pat. No. 9,767,404, issued on Sep. 19, 2017, which is a continuation application of U.S. application Ser. No. 14/578,196, entitled "RFID Switch Tag," filed Dec. 19, 2014, now U.S. Pat. No. 9,582,746, issued on Feb. 28, 2017, which is a continuation application of U.S. application Ser. No. 14/060,407, entitled "RFID Switch Tag," filed Oct. 22, 2013, now U.S. Pat. No. 8,944,337, issued on Feb. 3, 2015, which is a continuation application of U.S. application Ser. No. 13/465,834, filed May 7, 2012, entitled "RFID Switch Tag," now U.S. Pat. No. 8,561,911, issued on Oct. 22, 2013, which claims the benefit of priority under 35 U.S.C. 119 (e) to U.S. Provisional Application No. 61/487,372, entitled "RFID Switch Tag," filed May 18, 2011 and claims the benefit of priority under 35 U.S.C. 119 (e) to U.S. Provisional Application No. 61/483,586, entitled "RFID Switch Tag," filed May 6, 2011, all of which are incorporated herein by reference as if set forth in full; U.S. application Ser. No. 15/966,345 is also a continuation application of U.S. Ser. No. 15/705,210, entitled "RFID Switch Tag," filed Sep. 14, 2017, now U.S. Pat. No. 10,140,568 issued Nov. 7, 2018, which is a continuation application of U.S. Ser. No. 15/257,814, entitled "RFID Switch Tag," filed on Sep. 6, 2016, now U.S. Pat. No. 9,767,403, issued on Sep. 19, 2017, which is a continuation application of U.S. Ser. No. 14/480,458, entitled "RFID Switch Tag," filed on Sep. 8, 2014, now U.S. Pat. No. 9,436,900, issued on Sep. 6, 2016, which is a continuation application of U.S. Ser. No. 13/465,829, entitled "RFID Switch Tag," filed on May 7, 2012, now U.S. Pat. No. 8,844,831, issued on Sep. 30, 2014, which claims the benefit of priority under 35 U.S.C. 119 (e) to U.S. Provisional Application Ser. No. 61/483,586 filed May 6, 2011 and claims the benefit of priority under 35 U.S.C. 119 (e) to U.S. Provisional Application Ser. No. 61/487,372 filed May 18, 2011, the contents of all of which are incorporated herein by reference in their entireties as if set forth in full.

BACKGROUND

1. Field of the Invention

The embodiments described herein relate generally to the field of radio-frequency identification (RFID) devices, and more particularly, to RFID switch tags.

2. Related Art

Conventional RFID tags lack the ability to be deactivated. However, there are certain situations where it is actually desirable to have an RFID tag deactivated. For example, in the context of traveling, RFID tags will often contain sensitive personal information stored within, for instance, an e-Passport, a visa, or a national identification card. Such information may contain the traveler's name, birth date, place of birth, nationality, and/or biometric information associated with that traveler. This information is intended to be read only by customs officials or other governmental authorities when the traveler enters or exits a country. However, since the read range of RFID tags can extend up to 30 feet, since an RFID tag does not need to be directly in the line of sight of an RFID reader, this sensitive information may be read by any number of unauthorized individuals as the individual walks through a train station or an airport. Unless the traveler houses his travel documents within a Faraday shield or other type of electro-resistant casing (which most travelers do not have), the sensitive information stored within the RFID tag remains perpetually at risk of being read by these unauthorized parties.

As a second example, consider RFID tags that are installed within automobiles, where such tags are used to facilitate automatic billing for the repeated use of certain toll-roads. In some of these toll-roads, the use of a car-pool lane is considered free of charge (which may be validly used, for example, when the automobile is housing at least one passenger other than the driver). Since a driver's RFID tag may not be deactivated, however, the RFID tag may respond to an interrogation signal issued from the toll-gate even when the driver has validly used the carpool lane. The result is that the driver may be billed for using the toll-road even when such use should have been considered free of charge because of the driver's valid use of the car-pool lane.

What is needed is a system for an RFID tag that may be easily activated or deactivated. Ideally, the system should be versatile and provide a clear sensory indication of the operational status of the RFID tag (i.e., activated or deactivated).

SUMMARY

Various embodiments of the present invention are directed to RFID switch devices. Such RFID switch devices advantageously enable manual activation/deactivation of the RF module. The RFID switch device may include a RF module with an integrated circuit adapted to ohmically connect to a substantially coplanar conductive trace pattern, as well as booster antenna for extending the operational range of the RFID device. The operational range of the RFID switch device may be extended when a region of the booster antenna overlaps a region of the conductive trace pattern on the RF module via inductive or capacitive coupling. In some embodiments, all or a portion of the booster antenna may at least partially shield the RF module when the RFID switch device is in an inactive state. The RFID switch device may further include a visual indicator displaying a first color if the RFID switch device is in an active state and/or a second color if the RFID switch device is in an inactive state.

In a first exemplary aspect, an RFID device is disclosed. In one embodiment, the RFID device comprises: a booster antenna adapted to extend the operational range of the RFID device; an RF module comprising an integrated circuit and a set of one or more conductive traces, wherein at least one conductive trace of said set of one or more conductive traces is adapted to electrically couple to a coupling region of the booster antenna when the coupling region of the booster antenna is located in a first position relative to said set of one or more conductive traces; and a switching mechanism adapted to change the position of the coupling region of the booster antenna relative to the position of said at least one conductive trace.

In a second exemplary aspect, an RFID transponder is disclosed. In one embodiment, the RFID transponder comprises: a first substrate comprising a first conductive trace pattern, wherein at least a portion of the first substrate is adapted to serve as an antenna for the RFID transponder; a second substrate comprising an integrated circuit and a second conductive trace pattern, wherein at least a portion of the second conductive trace pattern is adapted to electrically couple with at least a portion of the first conductive trace pattern when the first substrate is located in a first position relative to the second substrate; and a switching mechanism adapted to switch the position of the first substrate between a first position and at least a second position.

In a third exemplary aspect, an RFID device is disclosed. In one embodiment, the RFID device comprises: a booster antenna adapted to extend the operational range of the RFID device; a first RF module comprising a first integrated circuit and a first conductive trace pattern, wherein at least a portion of the first conductive trace pattern is adapted to electrically couple to a coupling region of the booster antenna when the coupling region of the booster antenna is located in a first position relative to the first conductive trace pattern; a second RF module comprising a second integrated circuit and a second conductive trace pattern, wherein at least a portion of the second conductive trace pattern is adapted to electrically couple to the coupling region of the booster antenna when the coupling region of the booster antenna is located in a second position relative to the second conductive trace pattern; and a switching mechanism adapted to change the position of the coupling region of the booster antenna relative to the positions of said first and second RF modules.

In a fourth exemplary aspect, an RFID device is disclosed. In one embodiment, the RFID device comprises: a first booster antenna adapted to extend the operational range of a first RF module; a second booster antenna adapted to extend the operational range of a second RF module; the first RF module comprising a first integrated circuit and a first conductive trace pattern, wherein at least a portion of the first conductive trace pattern is adapted to electrically couple to a coupling region of the first booster antenna when the coupling region of the first booster antenna is located in a first position relative to the first conductive trace pattern; a second RF module comprising a second integrated circuit and a second conductive trace pattern, wherein at least a portion of the second conductive trace pattern is adapted to electrically couple to the coupling region of the second booster antenna when the coupling region of the second booster antenna is located in a second position relative to the second conductive trace pattern; and a switching mechanism adapted to change the position of the coupling region of the first booster antenna relative to the first RF module, and the position of the coupling region of the second booster antenna relative to the second RF module.

In a fifth exemplary aspect, an RFID device is disclosed. In one embodiment, the RFID device comprises: a first booster antenna adapted to extend the operational range of an RF module as used with a first RFID service; a second booster antenna adapted to extend the operational range of the RF module as used with a second RFID service; the RF module comprising an integrated circuit and a conductive trace pattern, wherein at least a portion of the conductive trace pattern is adapted to electrically couple to a coupling region of the first booster antenna when the coupling region of the first booster antenna is located in a first position relative to the conductive trace pattern; and wherein at least a portion of the conductive trace pattern is adapted to electrically couple to a coupling region of the second booster antenna when the coupling region of the second booster antenna is located in a second position relative to the conductive trace pattern; and a switching mechanism adapted to change the position of the RF module relative to the respective coupling regions of the first and second booster antennas.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding of the invention and shall not be considered limiting of the breadth, scope, or applicability of the embodiments. It should be noted that for clarity and ease of illustration these drawings are not necessarily made to scale.

DETAILED DESCRIPTION

Figure 1:
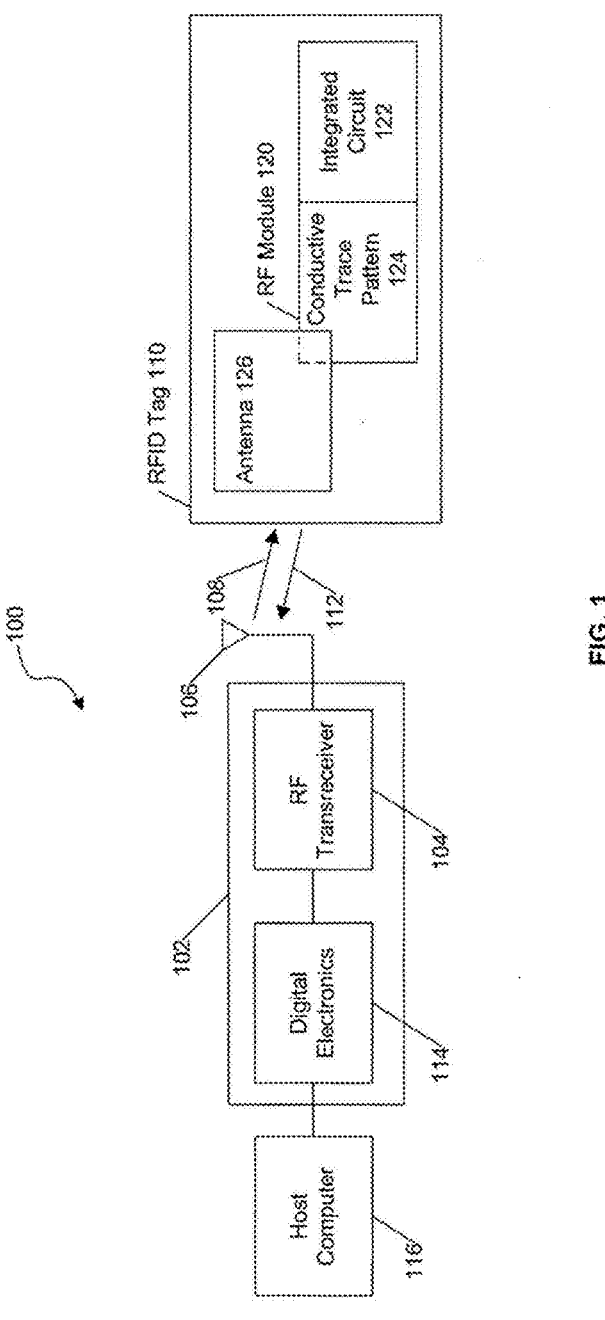
FIG. 1 is a block diagram illustrating an exemplary RFID system according to one embodiment of the present invention.

RFID is an automatic identification method, relying on storing and remotely retrieving data using devices called RFID tags or transponders. The technology relies on cooperation between an RFID reader and an RFID tag. RFID tags can be applied to or incorporated within a variety of products, packaging, and identification mechanisms for the purpose of identification and tracking using radio waves. For example, RFID is used in enterprise supply chain management to improve the efficiency of inventory tracking and management. Some tags can be read from several meters away and beyond the line of sight of the RFID reader.

Most RFID tags contain at least two parts: One is an integrated circuit for storing and processing information, for modulating and demodulating a radio-frequency (RF) signal, and for performing other specialized functions. The second is an antenna for receiving and transmitting the signal. As the name implies, RFID tags are often used to store an identifier that can be used to identify the item to which the tag is attached or incorporated. An RFID tag may also contain non-volatile memory for storing additional data as well. In some cases, the memory may be writable or electrically erasable programmable read-only memory (i.e., EEPROM).

Most RFID systems use a modulation technique known as backscatter to enable the tags to communicate with the reader or interrogator. In a backscatter system, the interrogator transmits a Radio Frequency (RF) carrier signal that is reflected by the RFID tag. In order to communicate data back to the interrogator, the tag alternately reflects the RF carrier signal in a pattern understood by the interrogator. In certain systems, the interrogator can include its own carrier generation circuitry to generate a signal that can be modulated with data to be transmitted to the interrogator.

RFID tags come in one of three types: passive, active, and semi passive. Passive RFID tags have no internal power supply. The minute electrical current induced in the antenna by the incoming RF signal from the interrogator provides just enough power for the, e.g., CMOS integrated circuit in the tag to power up and transmit a response. Most passive tags transmit a signal by backscattering the carrier wave from the reader. This means that the antenna has to be designed both to collect power from the incoming signal and also to transmit the outbound backscatter signal.

Passive tags have practical read distances ranging from about 10 cm (4 in.) (ISO 14443) up to a few meters (Electronic Product Code (EPC) and ISO 18000-6), depending on the chosen radio frequency and antenna design/size. The lack of an onboard power supply means that the device can be quite small. For example, commercially available products exist that can be embedded in a sticker, or under the skin in the case of low frequency RFID tags.

Unlike passive RFID tags, active RFID tags have their own internal power source, which is used to power the integrated circuits and to broadcast the response signal to the reader. Communications from active tags to readers is typically much more reliable, i.e., fewer errors, than from passive tags. Active tags, due to their on-board power supply, may also transmit at higher power levels than passive tags, allowing them to be more robust in "RF challenged" environments, such as high environments, humidity or with dampening targets (including humans/cattle, which contain mostly water), reflective targets from metal (shipping containers, vehicles), or at longer distances. In turn, active tags are generally bigger, caused by battery volume, and more expensive to manufacture, caused by battery price. Many active tags today have operational ranges of hundreds of meters, and a battery life of up to 10 years. Active tags can include larger memories than passive tags, and may include the ability to store additional information received from the reader, although this is also possible with passive tags.

Semi-passive tags are similar to active tags in that they have their own power source, but the battery only powers the microchip and does not power the broadcasting of a signal. The response is usually powered by means of backscattering the RF energy from the reader, where energy is reflected back to the reader as with passive tags. An additional application for the battery is to power data storage. The battery-assisted reception circuitry of semi-passive tags leads to greater sensitivity than passive tags, typically 100 times more. The enhanced sensitivity can be leveraged as increased range (by one magnitude) and/or as enhanced read reliability (by reducing bit error rate at least one magnitude).

FIG. 1 is a block diagram illustrating an exemplary RFID system according to one embodiment of the present invention. As shown by this figure, RFID interrogator 102 communicates with one or more RFID tags 110. Data can be exchanged between interrogator 102 and RFID tag 110 via radio transmit signal 108 and radio receive signal 112. RFID interrogator 102 may include RF transceiver 104, which contains both transmitter and receiver electronics configured to respectively generate and receive radio transit signal 108 and radio receive signal 112 via antenna 106. The exchange of data may be accomplished via electromagnetic or electrostatic coupling in the RF spectrum in combination with various modulation and encoding schemes.

RFID tag 110 can be a transponder attached to an object of interest and serve as an information storage mechanism. The RFID tag 110 may itself contain an RF module 120 (including an integrated circuit 122 and conductive trace pattern 124) as well as its own antenna 126. All or a portion of the antenna 126 may be adapted to interact with the conductive trace pattern 124 in order to gather energy from the RF field to enable the device circuit 122 to function. In some embodiments, the antenna 126 used to gather the RF energy may be in a different plane as that of the integrated circuit 122.

The data in the transmit signal 108 and receive signals 112 may be contained in one or more bits for the purpose of providing identification and other information relevant to the particular RFID tag application. When RFID tag 110 passes within the range of the radio frequency magnetic or electromagnetic field emitted by antenna 106, RFID tag 110 is excited and transmits data back to RF interrogator 102. A change in the impedance of RFID tag 110 can be used to signal the data to RF interrogator 102 via the receive signal 112. The impedance change in RFID tag 110 can be caused by producing a short circuit across the tag's antenna connections (not shown) in bursts of very short duration. RF transceiver 104 can sense the impedance change as a change in the level of reflected or backscattered energy arriving at antenna 106.

Digital electronics 114 (which in some embodiments comprises a microprocessor with RAM) performs decoding and reading of the receive signal 112. Similarly, digital electronics 114 performs the coding of the transmit signal 108. Thus, RF interrogator 102 facilitates the reading or writing of data to RFID tags, e.g. RFID tag 110 that are within range of the RF field emitted by antenna 104. Together, RF transceiver 104 and digital electronics 114 comprise reader 118. Finally, digital electronics 114 and can be interfaced with an integral display and/or provide a parallel or serial communications interface to a host computer or industrial controller, e.g. host computer 116.

As stated above, conventional RFID devices lack the ability to be manually activated or deactivated. Various embodiments of the present invention are therefore directed to an RFID switch tag adapted to allow a user to manually change the operational state of the RFID device by activation of a lever, switch, knob, slider, rotating member, or other similar structure.

Figures 2A, 2B, 2C:
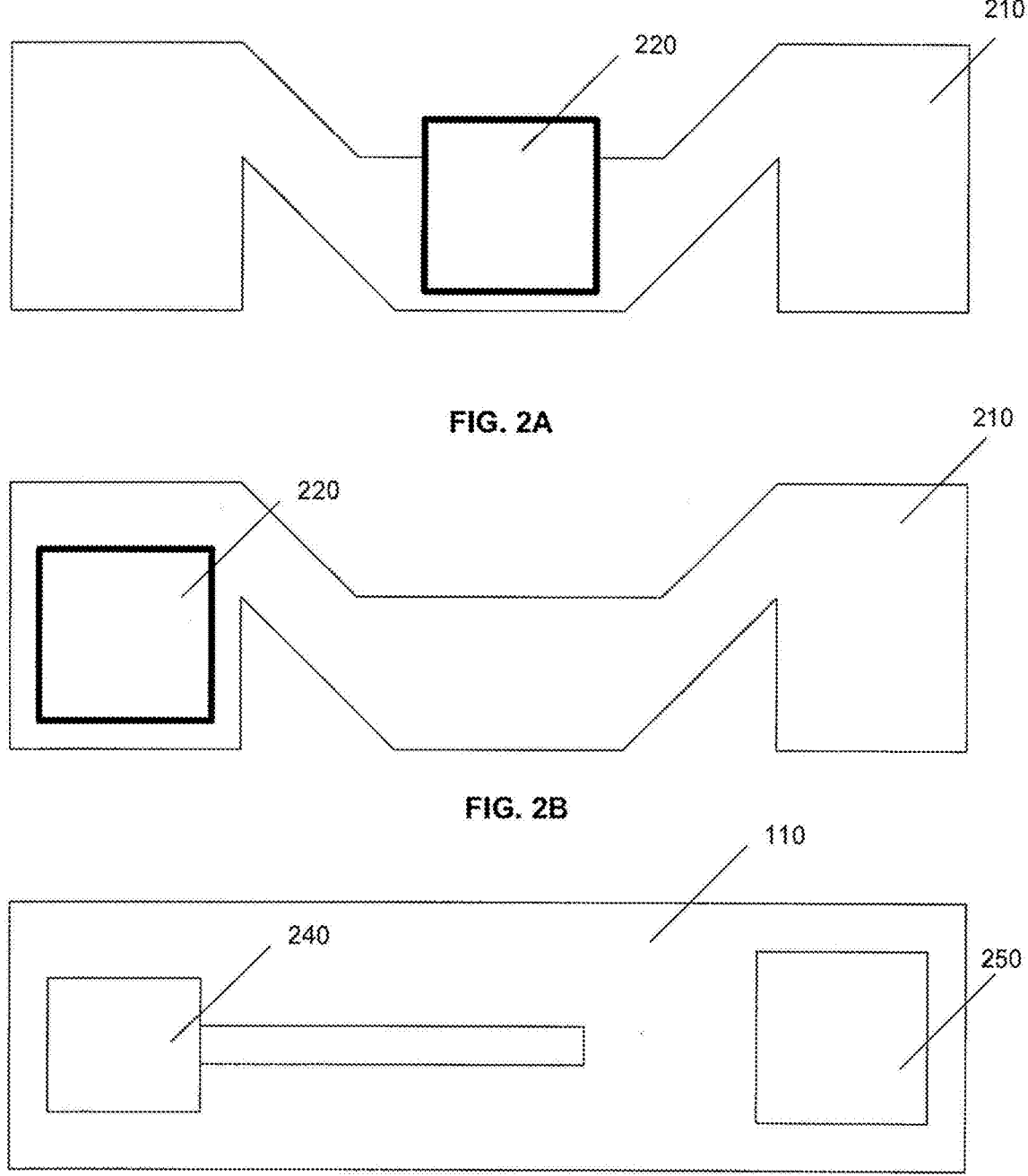
FIG. 2A is a block diagram illustrating an exemplary RFID switch tag with its RF module located in a first position relative to its booster antenna according to one embodiment of the present invention.
FIG. 2B is a block diagram of the exemplary RFID switch tag with its RF module located in a second position relative to its booster antenna according to the embodiment depicted in FIG. 2A.
FIG. 2C is a block diagram of the RFID switch tag depicted in FIGS. 2A and 2B as depicted within an exemplary casing featuring a position-altering mechanism according to one embodiment of the present invention.

As shown generally by the embodiments depicted in FIGS. 2A-2C, a tag may provided that includes an RF module, strap, or interposer, as well as a booster antenna 210. The RF module 220 may comprise an RFID integrated circuit in an ohmic connection to impedance matched conductive trace pattern in the same plane as the integrated circuit. Even though the RF module 220 is fully functional and testable, it may have a limited range of operation due to the small surface area of the conductive trace pattern.

According to one embodiment, the operational range of the RF module 220 can be increased by conductive or inductive coupling. For example, an impedance matched booster antenna 210 can be used in conjunction with the RF module 220. In one embodiment, this booster antenna 210 consists of a conductive trace pattern on a substrate. In this example, there is no RF device on the booster antenna 210. Rather, the RF module 220 and booster antenna 210 are provided with an area where they can overlap so that the capacitive or inductive coupling of energy occurs. The RF energy gathered from the booster antenna 210 may be transferred through the RF module substrate and conducted into the RF module 220. This is illustrated in FIG. 2A. As shown, the RF module 220 may be positioned relative to the booster antenna 210 such that RF energy gathered via the booster antenna 210 is transferred to the RF module 220.

While not shown, RF module 220 may comprise an RFID integrated circuit and a conductive trace pattern. These trace patterns can then be either inductively or capacitively coupled with a booster antenna 210. For optimal performance, the booster antenna 210 may be matched with the RFID integrated circuit inputs. If RF module 220 is displaced or not sufficiently coupled with antenna 210, then the operational range of the tag can be significantly reduced.

Thus, the placement of the RF module 220 with respect to the booster antenna 210 may alter the operational range and performance of the RFID tag 110. This is illustrated in FIG. 2B. In FIG. 2B, the relative positions of the RF module 220 and the booster antenna 210 are different than the arrangement shown in FIG. 2A. In the arrangement of FIG. 2B, a smaller portion, or none, of the RF energy collected by the booster antenna 210 is transferred to the RF module 220. In this manner, the effective operational range of the RFID tag 110 may be reduced as compared to the arrangement of FIG. 2A. In fact, because RF module 220 is completely or at least partially shielded by a portion of antenna 210, RFID communications between the RFID tag 110 and the RFID reader interrogator 102 may be completely halted. This non-operational state may be useful, for instance, in situations where it is desirable to render the RFID tag 110 unresponsive to an RFID interrogation signal. For example, as noted above, when no toll is due on a toll road due to the number of passengers in the car, it may be desirable for the RFID tag 110 to be unresponsive to an RFID interrogation issued by a toll road portal system.

In some embodiments, a mechanism is provided for selectively altering the relative position of RF module 220 and the booster antenna 210. Advantageously, this allows a user to selectively displace the RF module 220 from an optimized position over the booster antenna 210 rendering it unresponsive or detuned such that it will not respond at a sufficient measurement or perform adequately. Thus, for example, when taking a toll road that is free for car-pools, a user can manipulate the mechanism in order to effectively deactivate the RFID tag 110 and avoid paying the toll. In various embodiments, the mechanism may include a switch, lever, knob, slider, rotatable member, or any other device or construction which serves this purpose.

A selectively-activatable RFID tag 110 is depicted in FIG. 2C. The RFID tag 110 may comprise a slider mechanism 240 and an indicator area 250, where the RF module 220 is mechanically coupled to the slider 240. By manipulating the slider, a user modifies the relative positions of the RF module 220 and the booster antenna 210. The indicator area

250 may provide a visual indication of the status of the RFID tag 110. For example, if the RF module 220 and booster antenna 210 are positioned for effective transfer of RF power, the indicator area 250 may present a first visual indication such as a green color. Conversely, if the RF module 220 and booster antenna 210 are not positioned for effective transfer of RF power, the indicator area may provide a second visual indication such as a red color. In this manner, one or more individuals can be alerted of the effective operability of the RFID tag 110.

Figure 3:
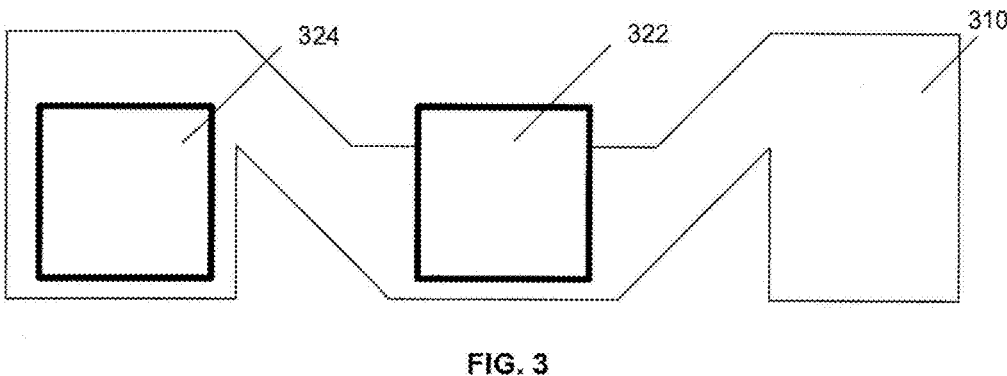
FIG. 3 is a block diagram illustrating an exemplary RFID switch tag including two RF modules and a single booster antenna according to one embodiment of the present invention.

FIG. 3 is a block diagram illustrating an exemplary RFID switch tag including two RF modules and a single booster antenna according to one embodiment of the present invention. As shown, a single booster antenna 310 is provided. However, in this embodiment two RF modules 322 and 324 are shown. The booster antenna 310 and RF modules 322 and 324 may be positioned such that only one of the two modules 322 and 324 is effectively coupled to the booster antenna 310 at any one time. For example, as shown in FIG. 3, RF module 322 is coupled to the booster antenna 310 while RF module 324 is shielded. Thus, RF module 322 is effectively tuned and responsive, while RF module 324 is effectively detuned and unresponsive.

A mechanism (e.g., switch, slider, knob, lever, rotatable member, etc.) such as the slider 240 depicted in FIG. 2C may be provided for selectively altering the relative position of RF module 322 and 324 and the booster antenna 310. In this manner, the positioning altering mechanism can be manipulated to selectively cause zero or one of the two modules 322 and 324 to be coupled to the antenna 310. For example, in a first state, only module 322 may be coupled with the booster antenna 310. In a second state, only module 324 may be coupled with booster antenna 310. In a third state, neither modules 322 or 324 are coupled with the booster antenna 310.

Advantageously, this arrangement allows a single RFID tag 110 to be used for multiple services. For example, one RF module, e.g. module 322, can be associated with toll road portal system. The other RF module, e.g., module 324, can be associated with a system for tracking car-pool lane use. The user can manipulate the position altering mechanism in order to couple the booster antenna 310 to the RF module 322 or 324 that is appropriate for current usage. In some embodiments, one or more visuals indicators may also be provided to indicate which RF module 322 or 324 is currently coupled to the booster antenna. Note also that while only two RF modules 322 and 324 are depicted in FIG. 3, any number of RF modules may be used in accordance with embodiments of the present invention.

In the embodiment of FIG. 3, the RF modules 322 and 324 may be aligned horizontally and the direction of movement caused by manipulation of the position altering mechanism may likewise be horizontal. In other embodiments, however, the RF modules 322 and 324 may be aligned vertically and the direction of movement may be vertical. In still other embodiments, the RF modules 322, 324 may be arranged in an arcuate manner and the direction of motion may also be arcuate. Various other arrangements of the RF modules 322 and 324, the booster antenna 310, and the direction of movement are also possible according to embodiments of the present invention.

Figure 4:
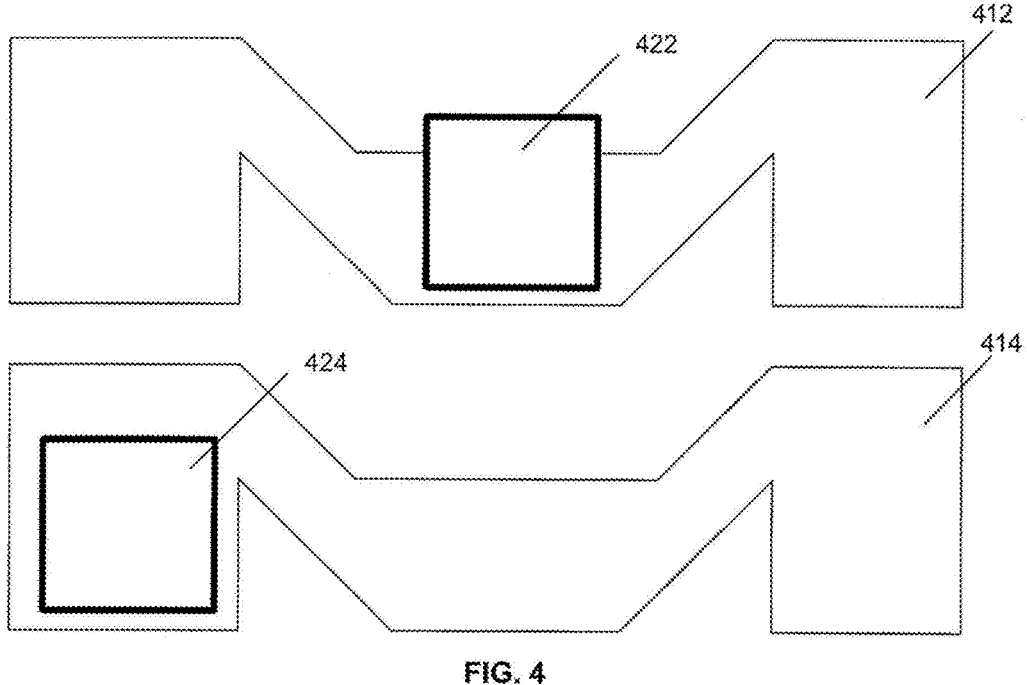
FIG. 4 is a block diagram illustrating an exemplary RFID switch tag including two RF modules and two corresponding booster antennas according to one embodiment of the present invention.

FIG. 4 is a block diagram illustrating an exemplary RFID switch tag including two RF modules and two corresponding booster antennas according to one embodiment of the present invention. As shown by the figure, two booster antennas 412 and 414 and two RF modules 422 and 424 are provided. In some embodiments, each RF module 422 and 424 may be associated with a different RFID service such that a user may independently tune each pair of RF modules 422 and 424 and booster antennas 412 and 414 present within the RFID tag 110. Note that while only two pairs of RF modules 422 and 424 and booster antennas 412 and 414 are depicted in FIG. 4, any number of RF module/booster antenna pairs may be utilized according to embodiments of the present invention.

While the embodiment depicted in FIG. 4 depicts the antennas 412 and 414 as bearing similar physical properties (such as size and shape), each booster antenna 412 and 414 may have differing physical properties according to alternative embodiments. These differences may result in different properties for gathering RF energies. In some embodiments, the antennas 412 and 414 may be specifically tuned to different frequencies.

According to some embodiments, each of the RF modules 422 and 424 may be attached to single position altering mechanism (not shown). In this manner, a user can manipulate the mechanism such that only one of the two RF modules 422 and 424 is coupled to its respective boost antenna 412 or 414 at any one time. A visual indicator may be provided to indicate which RF module 422 or 424 is currently coupled to its respective booster antenna 412 and 414. In some embodiments, the position altering mechanism may be manipulated such that both or neither of the RF modules 422 or 424 are coupled to the respective boost antennas 412 or 414 at the same time.

In other embodiments, each of the RF modules 422 and 424 may be attached to a separate position altering mechanism (not shown). According to these embodiments, both, neither, or only one of the RF modules 422 or 424 may be coupled to the respective boost antennas 412 and 414 at the same time. The visual indicator may display a first color if the first RF module 422 is active and a second color if the second RF module 424 is active.

Note that in the embodiment depicted in FIG. 4, the booster antennas 412 and 414 may be arranged along a vertical axis, and a horizontal direction of motion is utilized via manipulation of the position altering mechanism. However, persons skilled in the art will appreciate that the booster antennas 412 and 414 may be arranged horizontally, vertically, along an arc, in different planes, or in various other manners. Additionally, the direction of motion may switch the RF modules 422 and 424 between coupled and uncoupled positions for the respective booster antennas 412 and 414.

Figure 5:
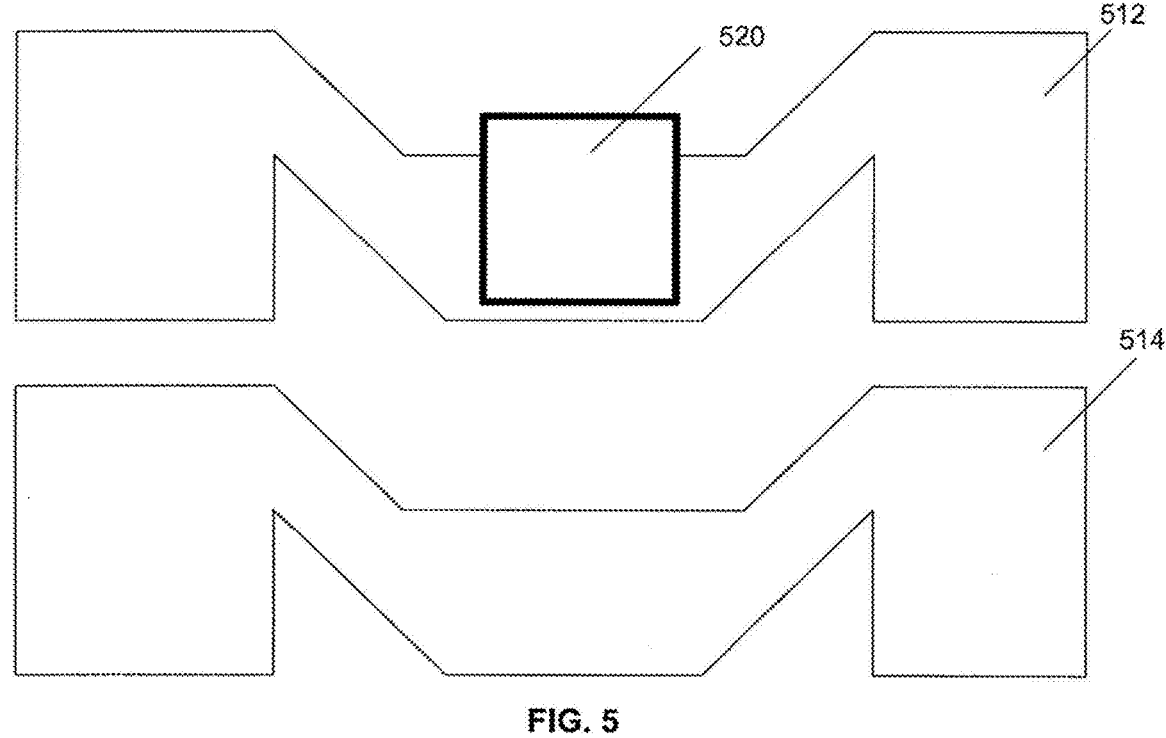
FIG. 5 is a block diagram illustrating an exemplary RFID switch tag including a single RF module and two booster antennas that are tuned to different frequencies according to one embodiment of the present invention.

FIG. 5 is a block diagram illustrating an exemplary RFID switch tag including a single RF module and two booster antennas that are tuned to different frequencies according to one embodiment of the present invention. As shown, a single RF module 520 may be provided, along with two booster antennas 512 and 514. The booster antennas 512 and 514 may be configured with different physical properties to enable the RF module 520 to switch between separate RFID services. In this respect, the RF module 520 may be mechanically coupled to a position altering mechanism such that the tag can be switched to select one or none of the booster antennas 512 and 514. A visual indicator may display a first color if the first booster antenna 512 corresponding to a first RFID service is selected and a second color if the second booster antenna 514 corresponding to a second RFID service is selected.

As in the case of FIG. 4, the booster antennas 512 and 514 may be arranged along a vertical axis and the direction of motion of the RF module 520 caused by manipulation of the position altering mechanism is vertical. In other embodiments, the booster antennas 512 and 514 may be arranged horizontally, along an arc, in different planes, or in another manner and the direction of motion is adapted to switch the RF module 520 between the booster antennas 512 and 514.

FIGS. 6A-10 generally depict various embodiments of RFID switch tags which may be utilized, for example, within an automobile setting. Each of the RFID switch tags may be affixed, fastened, or adhered to a windshield, rearview mirror, automobile exterior, or to various other areas of the automobile according to embodiments of the present invention.

Figure 6A:
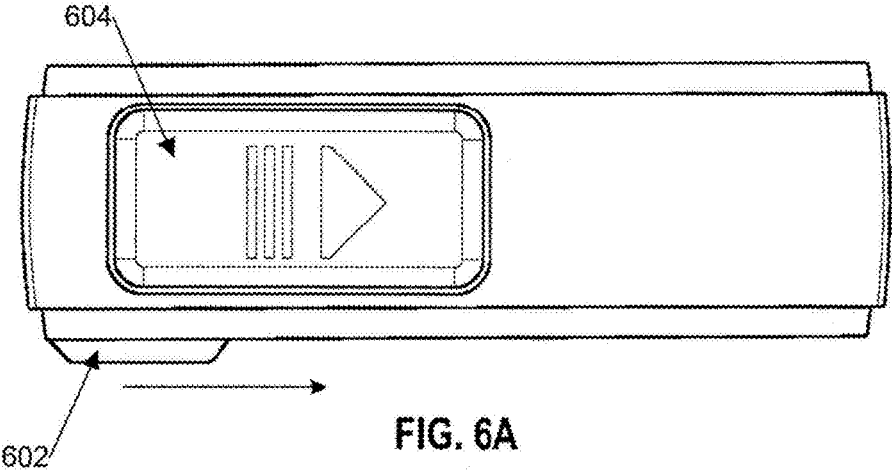
FIG. 6A is a front-side view of an exemplary switch-activated RFID tag according to one embodiment of the present invention.
Figure 6B:
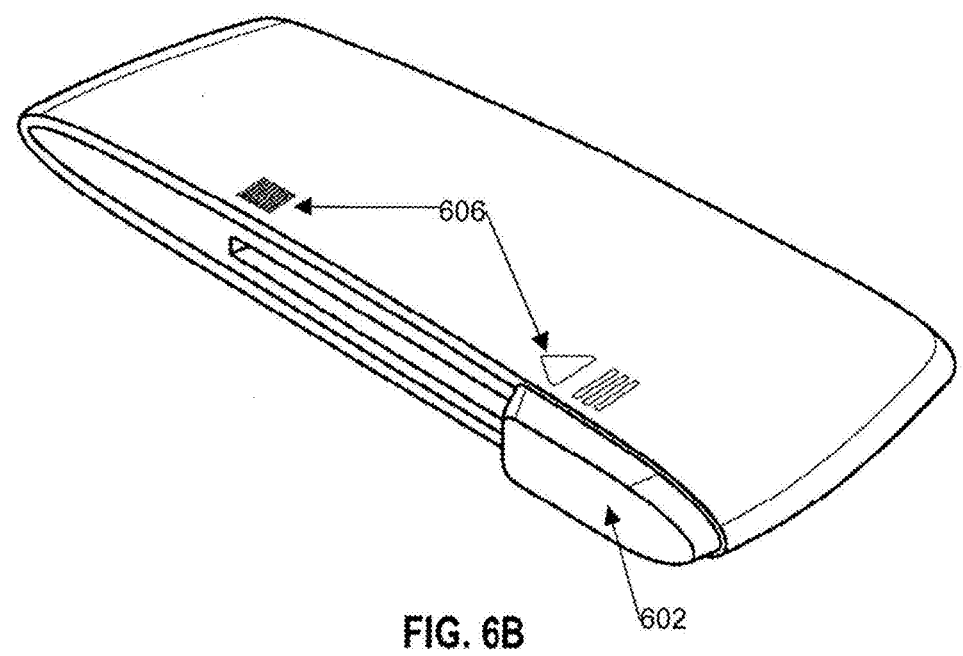
FIG. 6B is a perspective view of the back side of the exemplary switch-activated RFID tag according to the embodiment depicted in FIG. 6A.

FIG. 6A is a front-side view of an exemplary switch-activated RFID tag according to one embodiment of the present invention, while FIG. 6B is a perspective view of the back side of the exemplary switch-activated RFID tag according to the embodiment depicted in FIG. 6A. As shown by the figure, the RFID tag may include a slider configuration 602 with a window 604 on the outside and one or more icon graphics 606 on the opposite side. In some embodiments, an optional mounting component (not shown) may be used to adhere, fasten, or clip the RFID tag to a visor, for example.

Figure 7A:
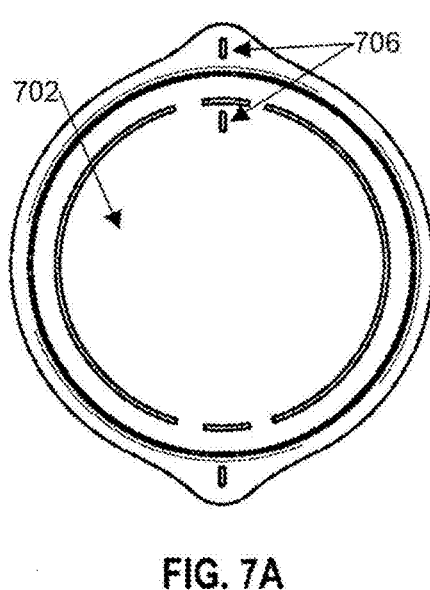
FIG. 7A is a back-side view of an exemplary circular-shaped and rotatable RFID switch tag in a first position according to one embodiment of the present invention.
Figure 7B:
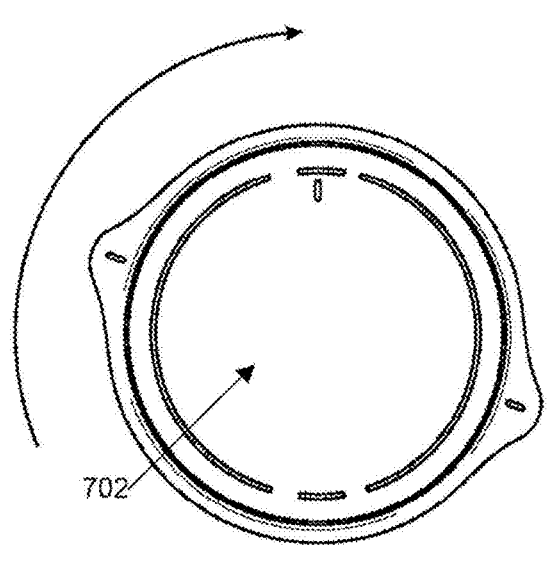
FIG. 7B is a back-side view of the exemplary circular-shaped and rotatable RFID switch tag in a second position according to the embodiment depicted in FIG. 7A.
Figure 7C:
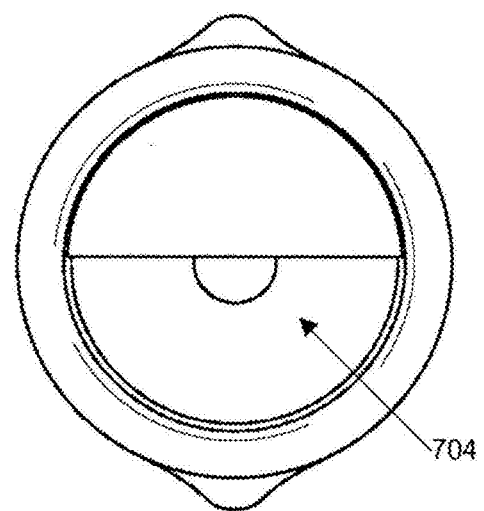
FIG. 7C is a front-side view of the exemplary circular-shaped and rotatable RFID switch tag depicted in FIGS. 7A and 7B.

FIG. 7A is a back-side view of an exemplary circular-shaped and rotatable RFID switch tag in a first position according to one embodiment of the present invention, FIG. 7B is a back-side view of the exemplary circular-shaped and rotatable RFID switch tag in a second position according to the embodiment depicted in FIG. 7A, while FIG. 7C is a front-side view of the exemplary circular-shaped and rotatable RFID switch tag depicted in FIGS. 7A and 7B. As depicted in FIGS. 7A and 7B, a circular shaped member 702 may be rotated, for example, clockwise or counterclockwise, in order to activate or deactivate the RFID switch tag. Icon graphics 706 on the back-side may be used to inform one or more individuals of the activation state of the RFID switch tag. Optionally, a window 704 on the opposite side of the RFID switch tag (see FIG. 7C) may be used to reveal the activation state of the RFID switch tag to the outside.

Figure 8A:
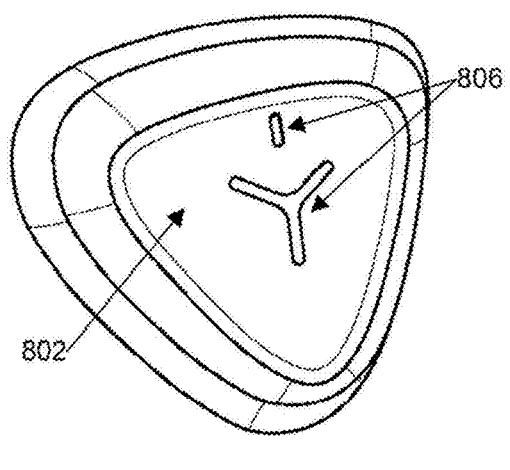
FIG. 8A is a perspective view of the back side of an exemplary triangular-shaped and rotatable RFID switch tag in a first position according to one embodiment of the present invention.
Figure 8B:
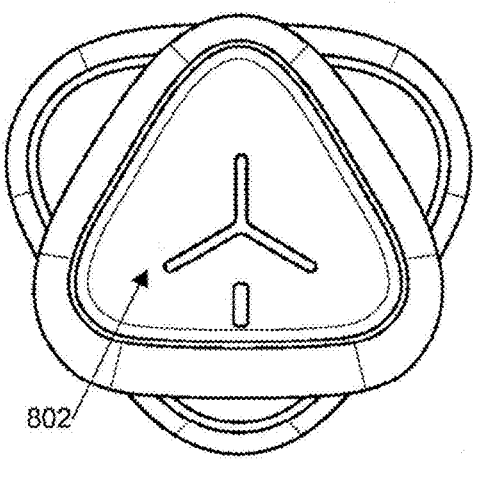
FIG. 8B is a back-side view of the exemplary triangular-shaped and rotatable RFID switch tag in a second position according to the embodiment depicted in FIG. 8A.
Figure 8C:
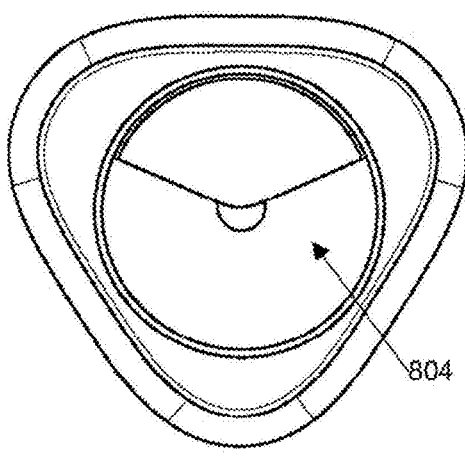
FIG. 8C is a front-side of the exemplary triangular-shaped and rotatable RFID switch tag depicted in FIGS. 8A and 8B.

FIG. 8A is a perspective view of the back side of an exemplary triangular-shaped and rotatable RFID switch tag in a first position according to one embodiment of the present invention, FIG. 8B is a back-side view of the exemplary triangular-shaped and rotatable RFID switch tag in a second position according to the embodiment depicted in FIG. 8A, while FIG. 8C is a front-side of the exemplary triangular-shaped and rotatable RFID switch tag depicted in FIGS. 8A and 8B. FIGS. 8A-8C may operate similar to FIG. 7A-7C, but utilize a substantially triangular shape and design rather than a circular one. Various other shapes and designs may also be utilized in accordance with embodiments of the present invention.

Figure 9A:
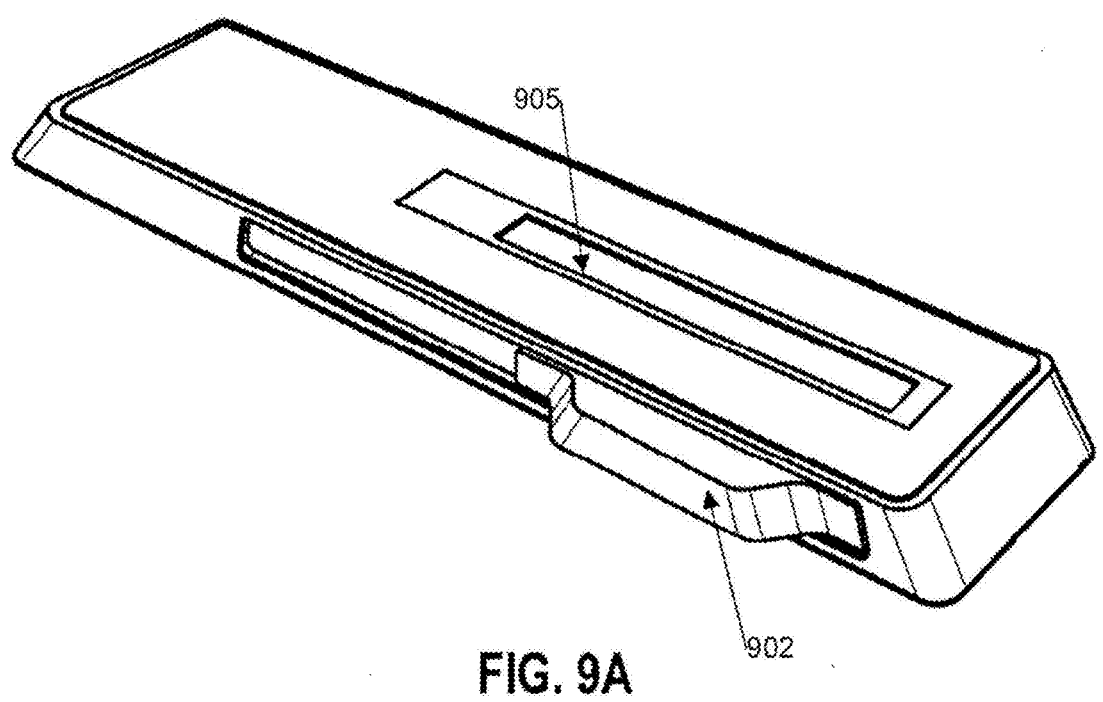
FIG. 9A is a perspective view of the back side of an exemplary switch-activated RFID tag according to one embodiment of the present invention.
Figure 9B:
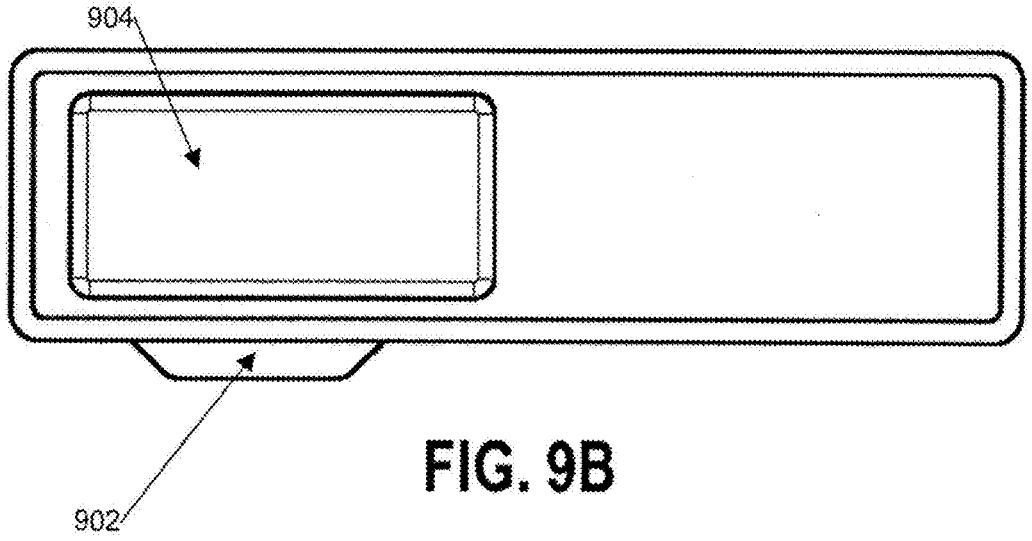
FIG. 9B is a front-side view of the exemplary switch-activated RFID tag depicted in FIG. 9A.

FIG. 9A is a perspective view of the back side of an exemplary switch-activated RFID tag according to one embodiment of the present invention, while FIG. 9B is a front-side view of the exemplary switch-activated RFID tag depicted in FIG. 9A. As depicted in FIG. 9A, the RFID tag may utilize a slider configuration 902 with a windows on both sides 904 and 905 of the RFID tag. Such an RFID tag may be adhered to the window of the automobile or may also use a cradle system for mobility according to various embodiments.

Figure 10:
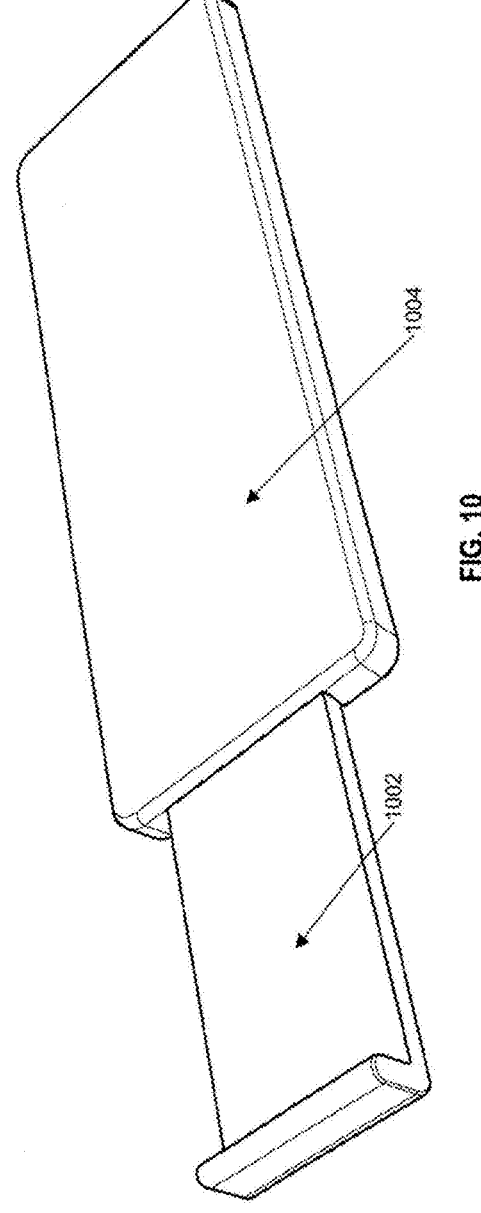
FIG. 10 is a perspective view of an exemplary slide-activated RFID tag according to one embodiment of the present invention.

FIG. 10 is a perspective view of a separate exemplary slide-activated RFID tag according to one embodiment of the present invention. According to some embodiments, no physical switch or level is utilized. Instead, the RFID tag may be activated or deactivated by manually sliding a first substrate 1002 to or from a casing 1004.

Figure 11:
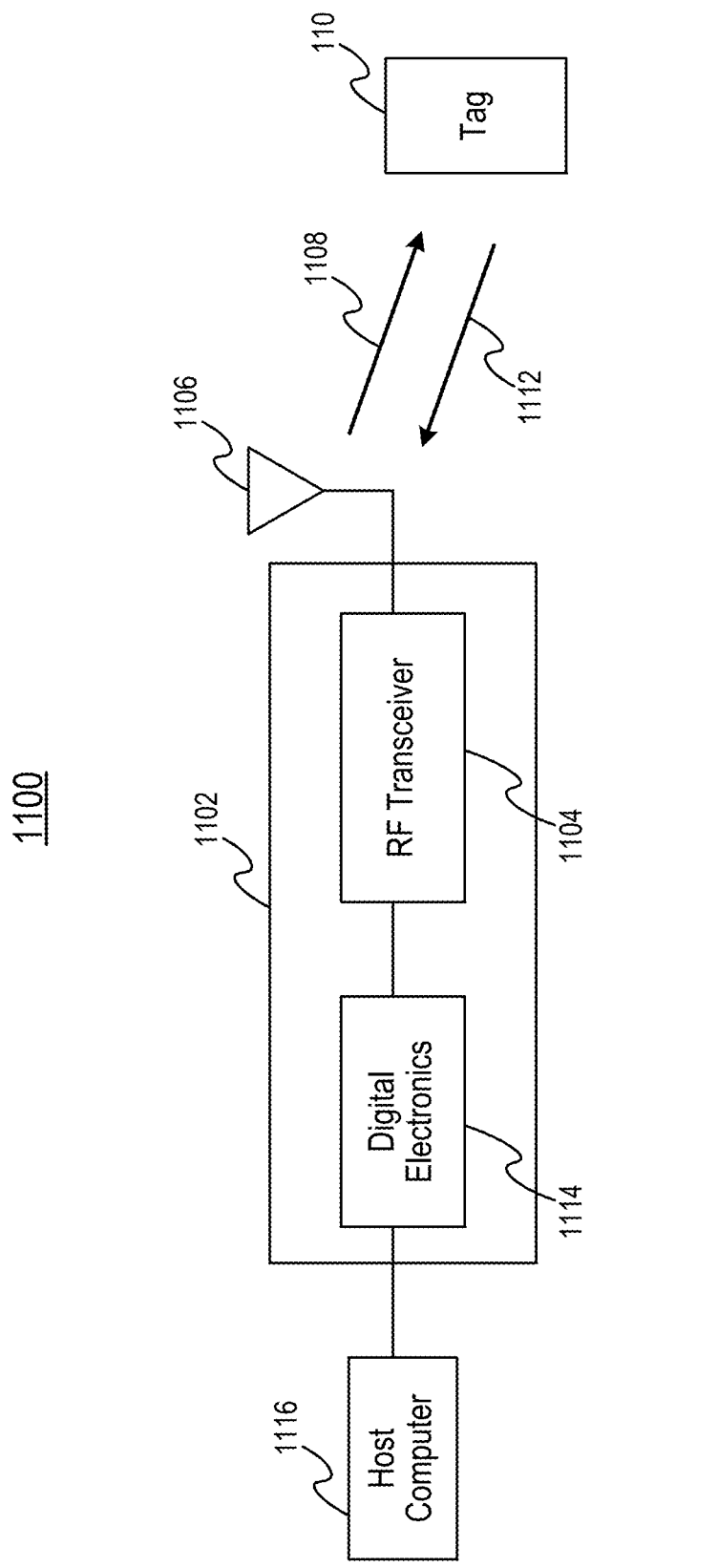
FIG. 11 shows a diagram illustrating an exemplary RFID system in accordance with one embodiment described herein.

FIG. 11 shows a diagram illustrating an exemplary RFID system 1100 in accordance with one embodiment described herein. In system 1100, RFID interrogator 1102 communicates with one or more RFID tags 1110. Data can be exchanged between interrogator 102 and RFID tag 1110 via radio transmit signal 1108 and radio receive signal 1112. RFID interrogator 1102 comprises RF transceiver 1104, which contains transmitter and receiver electronics, and antenna 1106, which are configured to generate and receive radio transit signal 1108 and radio receive signal 1112, respectively. Exchange of data can be accomplished via electromagnetic or electrostatic coupling in the RF spectrum in combination with various modulation and encoding schemes.

RFID tag 1110 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner. Consequently, the range of transmit signal 108 determines the operational range of RFID tag 1110.

RF transceiver 1104 transmits RF signals to RFID tag 1110, and receives RF signals from RFID tag 1110, via antenna 1106. The data in transmit signal 1108 and receive signal 1112 can be contained in one or more bits for the purpose of providing identification and other information relevant to the particular RFID tag application. When RFID tag 1110 passes within the range of the radio frequency magnetic field emitted by antenna 1106, RFID tag 1110 is excited and transmits data back to RF interrogator 1102. A change in the impedance of RFID tag 1110 can be used to signal the data to RF interrogator 1102 via receive signal 1112. The impedance change in RFID tag 1110 can be caused by producing a short circuit across the tag's antenna connections (not shown) in bursts of very short duration. RF transceiver 1104 senses the impedance change as a change in the level of reflected or backscattered energy arriving at antenna 1106.

Digital electronics 1114, which can comprise a microprocessor with RAM, performs decoding and reading of receive signal 1112. Similarly, digital electronics 1114 performs coding of transmit signal 108. Thus, RF interrogator 102 facilitates the reading or writing of data to RFID tags, e.g. RFID tag 1110 that are within range of the RF field emitted by antenna 11104. Together, RF transceiver 104 and digital electronics 1114 comprise reader 118. Finally, digital electronics 1114 and can be interfaced with an integral display and/or provide a parallel or serial communications interface to a host computer or industrial controller, e.g. host computer 1116.

Figure 12:
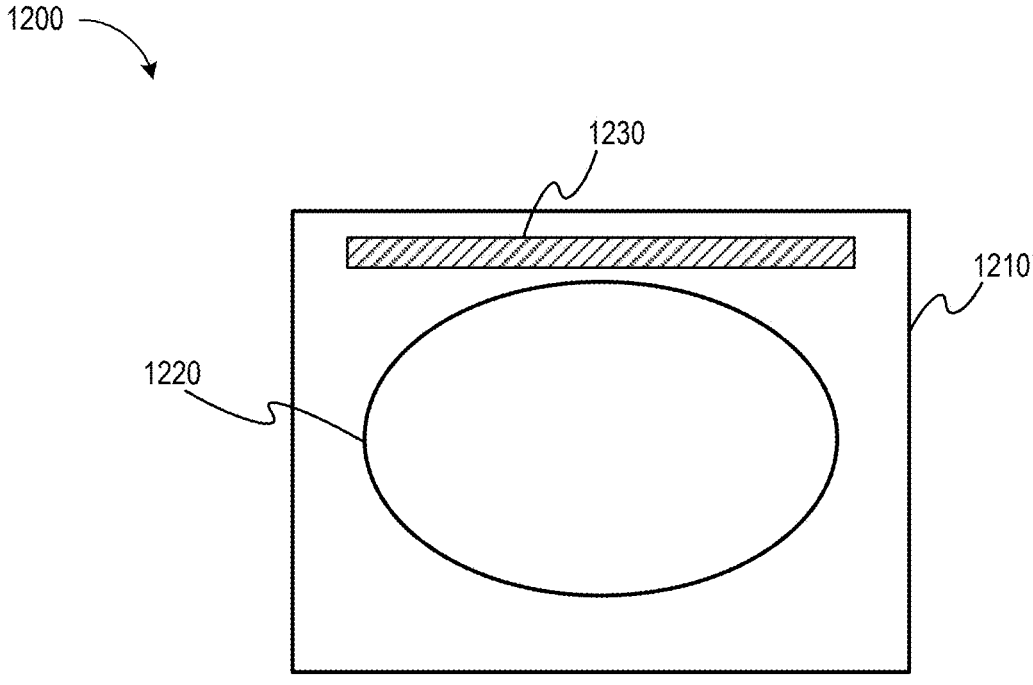
FIG. 12 shows a top-view illustration of an exemplary RFID switch tag in an attached configuration in accordance with one embodiment described herein.

FIG. 12 shows a top-view illustration of an exemplary RFID switch tag 1200 in an attached configuration in accordance with one embodiment described herein. In some embodiments, RFID switch tag 1200 is used to implement RFID tag 1110 in RFID system 1100 shown in FIG. 11. As illustrated in FIG. 12, RFID switch tag 1200 includes a base component 1210 and a detachable component 1220. In some embodiments, base component 1210 includes an UHF booster 1230, such as a booster antenna. Note that UHF booster 1230 can include a passive booster, an active booster, or a battery-assisted passive booster. The detachable component 1220 can include at least one UHF RFID module and an HF RFID module or tag. In particular embodiments, the at least one HF RFID module included in detachable component 1220 is a near field communication (NFC) module. In some embodiments, the UHF RFID module and the HF RFID module share a common integrated circuit (IC) chip. In these embodiments, detachable component 1220 essentially acts as a dual-frequency RFID tag.

The reference to a HF or UHF tag is intended to indicate that the HF or UHF module included in detachable component 1220 comprise all the components necessary to perform the functions of a RFID tag, such as described with respect to tag 1110 in FIG. 11. As noted, in certain embodiments, the modules can share components such as the IC, or portions of the IC and potentially the antenna. Although, sharing of the antenna or any components can depend on the frequency of operation, the required matching impendence, the protocols being used, etc.

Although the embodiment of FIG. 12 shows that detachable component 1220 is positioned substantially in the middle of base component 210, other embodiments can have detachable component 1220 placed in a non-centered position relative to base component 210. When placed near the base component 1210, the UHF module can be configured such that it will inductively couple with the UHF booster antenna 1230 in the base component 1210.

In one exemplary embodiment, the at least one UHF RFID module included in detachable component 1220 is coupled with UHF booster antenna 1230 included in base component 1210 to form an UHF RFID system of desire performances. For example, the desired performances include a desired operating range for the UHF RFID system. In one embodiment, an UHF coupling antenna within the at least one UHF RFID module in detachable component 1220 is positioned in a manner to ensure a sufficient amount of coupling, such as an inductive coupling, a capacitive coupling, or both, between the UHF coupling antenna in detachable component 1220 and UHF booster antenna 1230 in base component 1210. The at least one UHF RFID module and the HF RFID tag, such as an NFC tag included in the detachable component 1220 can be active, passive, or battery-assisted passive without departing from the scope of the inventive concept of this disclosure.

Although detachable component 1220 is shown to have an oval shape, other embodiments of detachable component 1220 can have other shapes, such as a circular shape, a rectangular shape, a triangular shape without departing from the scope of the inventive concept of this disclosure. Furthermore, if detachable component 1220 has a rectangular shape, the rectangular shape can have either right-angled corners or rounded-corners. When detachable component 1220 has a rectangular shape and rounded-corners, detachable component 1220 may have an appearance of a card.

In RFID switch tag 1200 shown in FIG. 12, detachable component 1220 may be attached to base component 1210 in a number of ways. For example, detachable component 1220 can be placed inside a pocket attached to base component 1210. In some embodiments, detachable component 1220 can be placed inside a cutout within base component 1210 having a shape of detachable component 1220 but configured with a slightly smaller profile to allow detachable component 1220 to be securely held inside the cutout.

According to one exemplary embodiment, RFID switch tag 1200 can serve as a windshield tag. In this embodiment, base component 1210 of RFID switch tag 1200 can be attached to a vehicle's windshield using, for example, adhesives (e.g., adhesive strips). When RFID switch tag 1200 is used as a windshield tag, RFID switch tag 1200 can be used in various electronic toll collection (ETC) applications. For example, when RFID switch tag 1200 is placed on a windshield with both base component 1210 and detachable component 220, the at least one UHF module in detachable component 1220 is coupled with UHF booster antenna 1230 in base component 1210 to form an UHF system having desired performances, such as a long operating range; however, when detachable component 1220 is separated from base component 1210 and the windshield, base component 1210 can remain on the windshield but the at least one UHF module in detachable component 1220 is no longer coupled to UHF booster antenna 1230 in base component 1210. As a result, neither the at least one UHF module in detachable component 1220 nor UHF booster antenna 1230 in base component 1210 can be able to achieve the intended functionality of an UHF system, i.e., the UHF module is disabled.

Figure 13:
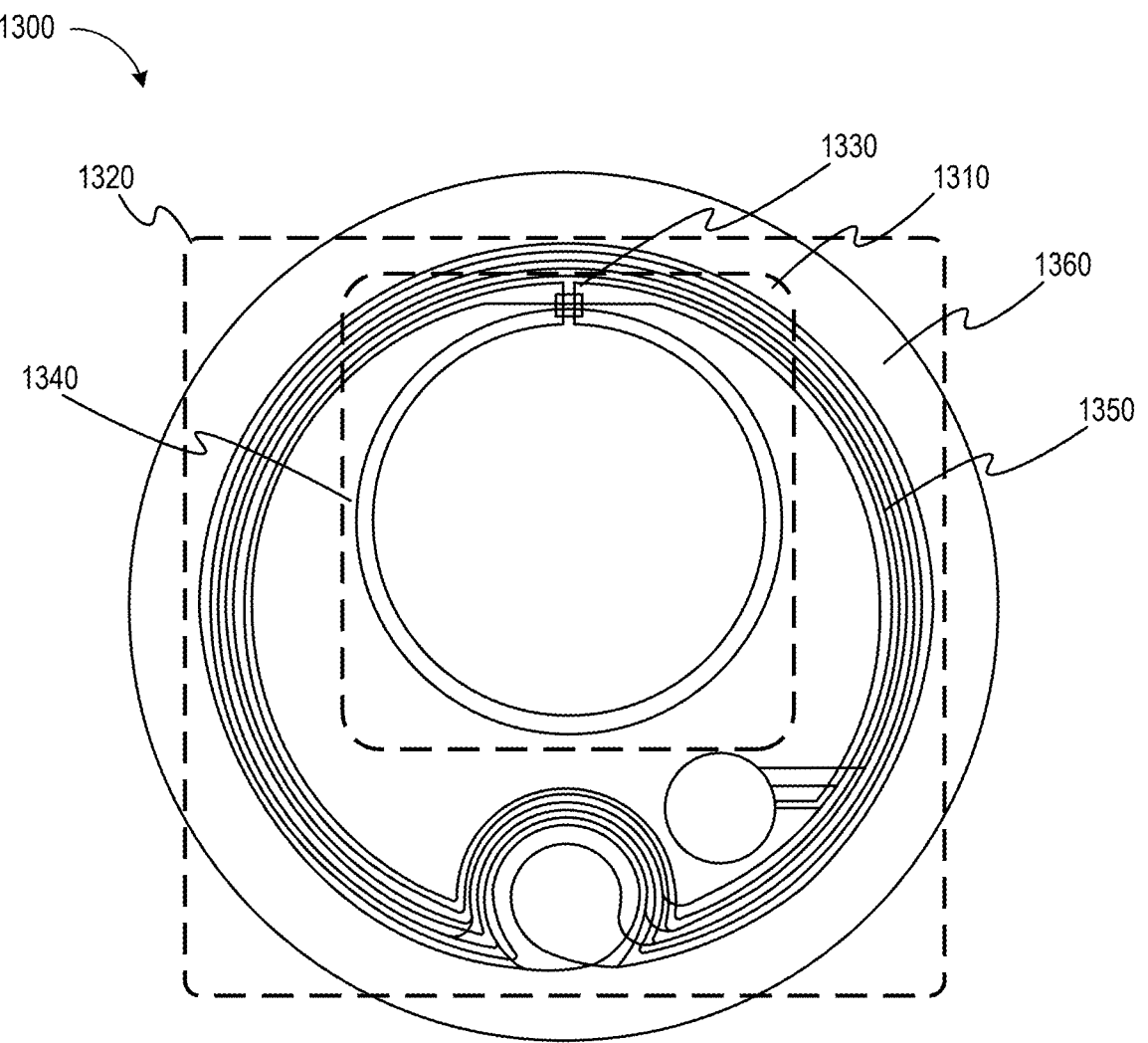
FIG. 13 shows a top-view illustration of an exemplary detachable component in the form of a dual-frequency RFID module in accordance with some embodiments described herein.

FIG. 13 shows a top-view illustration of an exemplary detachable component 1220 in the form of a dual-frequency RFID module 1300 in accordance with some embodiments described herein. As illustrated in FIG. 13, multi-frequency RFID module 1300 includes an UHF module 1310 and an NFC tag 1320. More specifically, UHF module 1310 further includes an integrated circuit (IC) chip 1330 (or "chip 1330" hereinafter) and an UHF loop 1340, while NFC tag 1320 further includes chip 1330 and an HF antenna 1350. Hence, in the embodiment shown, UHF module 1310 and NFC tag 1320 share chip 1330. Chip 1330 can include a memory (not shown) and other circuits. Dual-frequency RFID module 1300 can also include a substrate 1360 that provides structural supports for UHF module 1310 and NFC tag 1320. In various embodiments, chip 1330, UHF loop 1340 and HF antenna 1350 can be deposited or fabricated on substrate 1360.

In the embodiment of multi-frequency RFID module 1300 illustrated in FIG. 13, UHF loop 1340 is positioned substantially inside the loops of HF antenna 1350. In some embodiments, HF antenna 1350 is tuned to operate at a desired high frequency, such as 13.56 MHz. UHF loop 1340 can also be tuned to operate at a desired ultra high frequency, such as 915 MHz or 2.45 GHz. In some embodiments, UHF loop 1340 is used to couple chip 1330 to UHF booster antenna 1230 in base component 1210 to form a functional UHF RFID tag. UHF loop 1340 can be an UHF antenna by itself. Generally, UHF loop 1340 can be implemented as any coupling means for coupling chip 1330 to UHF booster antenna 1230 in base component 1210.

In the exemplary embodiment shown in FIG. 13, HF antenna 1350 is configured as a loop antenna that includes multiple circular loops. However, in other embodiments, HF antenna 1350 can be constructed with non-circular-shaped loops, such as rectangular loops without departing from the scope of the present inventive concept. Also in this embodiment, UHF loop 1340 is shown to include two circular loops; however, in other embodiments, UHF loop 1340 can include a single loop or more than two loops. While loops in UHF loop 1340 is shown to be circular, UHF loop 1340 can also be constructed with non-circular-shaped loops, such as rectangular loops without departing from the scope of the present inventive concept.

In some embodiments, chip 1330 is configured to perform functions associated with both NFC and UHF systems including, but not limited to, encoding/decoding, modulation/demodulation, digital and analog processing, and data storage. Although multi-frequency RFID module 1300 uses a single IC chip 1330 for both the UHF RFID module and the NFC tag, other implementations of detachable component 1220 can use separate IC chips for the UHF RFID module and the NFC tag.

Figure 14:
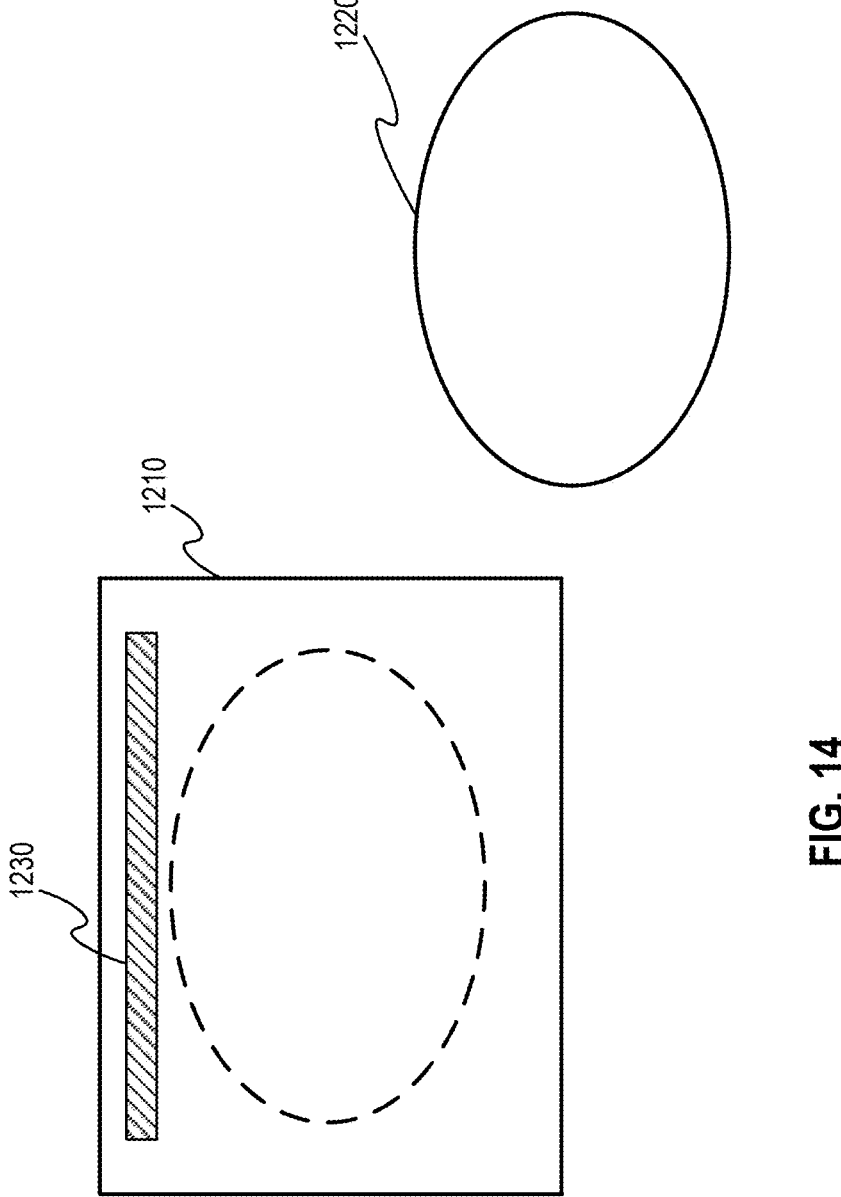
FIG. 14 shows a top-view illustration of RFID switch tag in a detached configuration in accordance with one embodiment described herein.
Figure 14:
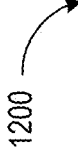

FIG. 14 shows a top-view illustration of RFID switch tag 1200 in a detached configuration in accordance with one embodiment described herein. Referring to FIGS. 12 and 14, while FIG. 12 shows that detachable component 1220 is attached to base component 1210, FIG. 14 shows that detachable component 1220 can be separated and detached from base component 1210. Notably, detaching detachable component 1220 from base component 1210 uncouples the at least one UHF RFID module in detachable component 1220 from UHF booster antenna 1230 in base component 1210. As such, when detachable component 1220 is detached from base component 1210, the performances of the at least one UHF RFID module may be significantly affected. For example, detaching detachable component 1220 from base component 1210 can render the at least one UHF RFID module nonfunctional.

Notably, the HF RFID tag such as an NFC tag within detachable component 1220 can remain functional when detachable component 1220 is separated from base component 1210. As such, detached detachable component 1220 can be used exclusively as an HF RFID tag, such as an NFC tag (e.g., for making contactless payments). When used as an NFC tag, detachable component 1220 can be configured with a shape and dimensions (including width, height, and thickness) so that it is sufficiently durable and can be conveniently placed inside a wallet, a purse, or a protective cover of a portable electronic device, such as a smartphone, a tablet, or an iPad™M. The dimensions of detachable component 1220 can be significantly greater than a typical RFID tag. In some embodiments, a rectangular shape having a size and a thickness that resembles a credit card is preferred. When detached from base component 1210, detachable component 1220 can be use in a "tap and go" manner in various NFC applications without being taken out of a wallet, a purse, or a protective cover of a portable electronic device where detachable component 1220 is stored and carried around. In various embodiments, detachable component 1220 is configured as a laminated card so that it is sufficiently durable through extensive uses as a standalone card. In some embodiments, detachable component 1220 is configured with a hard case to provide additional durability and protection.

In some embodiments, RFID switch tag 1200 is used in various ETC applications. For example, the at least one UHF RFID module in RFID switch tag 1200 can be configured to be used in high occupancy vehicle (HOV) lanes, while the HF RFID tag in RFID switch tag 1200 can be configured to be used in single occupancy vehicle (SOV) lanes. Hence, by switching detaching detachable component 1220 between the detached configuration of RFID switch tag 1200 and the attached configuration of RFID switch tag 1200, RFID switch tag 1200 permits a driver to switch between HOV operations and SOV operations using a single RFID switch tag 1200. In such embodiments, the tag 1200 can include a switching mechanism that allows the user to switch between the UHF and HF tags as required. U.S. patent application Ser. No. 15/160,982, entitled "Multi-Frequency Radio Frequency Identification Tag," filed May 20, 2016, which in turn claims priority to U.S. provisional Patent Application No. 62/165,167, also entitled "Multi-Frequency Radio Frequency Identification Tag," filed May 21, 2015; U.S. patent application Ser. No. 14/818,257, entitled "Methods and Apparatus for Preserving Privacy in an RFID System," filed Aug. 4, 2015, which in turn claims priority to U.S. patents application Ser. No. 14/229,786, now U.S. Pat. No. 9,098, 790, entitled "Methods and Apparatus for Preserving Privacy in an RFID System," filed Mar. 28, 2014, which in turn claims priority to U.S. patents application Ser. No. 13/736, 819, now U.S. Pat. No. 8,710,960, entitled "Methods and Apparatus for Preserving Privacy in an RFID System," filed Jan. 8, 2013, which in turn claims priority to U.S. patents application Ser. No. 12/364,158, now U.S. Pat. No. 8,350, 673, entitled "Methods and Apparatus for Preserving Privacy in an RFID System," filed Feb. 2, 2009, which in turn claims priority to U.S. provisional Patent Application No. 61/025,000, also entitled "Method and Apparatus for Preserving Privacy in RFID Systems," filed Jan. 31, 2008; U.S. Patent Application No. 14/480,458, entitled "RFID Switch Tag," filed Sep. 8, 2014, which in turn claims priority to U.S. patents application Ser. No. 13/465,829, now U.S. Pat. No. 8,844,831, entitled "RFID Switch Tag," filed May 7, 2012, which in turn claims priority to U.S. provisional Patent Application Nos. 61/487,372, filed May 18, 2011 and 61/483,586, filed May 6, 2011, both entitled "RFID Switch Tag;" U.S. patent application Ser. No. 14/578,196, entitled "RFID Switch Tag," filed Dec. 19, 2014, which in turn claims priority to U.S. patent application Ser. No. 14/060, 407, now U.S. Pat. No. 8,944,337, entitled "RFID Switch Tag," filed Oct. 22,2013, which in turn claims priority to U.S. patents application Ser. No. 13/465,834, now U.S. Pat. No. 8,561,911,entitled "RFID Switch Tag," filed May 7, 2012, which in turn claims priority to U.S. provisional Patent Application Nos. 61/487,372, filed May 18, 2011 and 61/483,586, filed May 6, 2011, both entitled "RFID Switch Tag," all of which are incorporated herein by reference as if set forth in full; disclose various embodiments of tags that allow switching between modules incorporated within a switchable and/or multi-frequency tag. Any of these mechanisms can be used in accordance with switch tag 1200.

According to one exemplary embodiment, RFID switch tag 1200 can be used in one or more account management applications. For example, RFID switch tag 1200 can be used to track a vehicle for purposes of electronic tolling, parking access, and border control. At least some applications for the RFID switch tag 1200 are described in U.S. Pat. Nos. 8,844,831 and 8,944,337, and U.S. patents application Ser. Nos. 14/480,458 and 14/578,196, the disclosures of which are incorporated herein by reference in their entirety.

In some embodiments, access to the memory on the at least one UHF module and the NFC tag included in the detachable component 1220 can be granted based on a security key. The provision of secure identification solutions is described in U.S. Pat. Nos. 7,081,819, 7,671,746, 8,237, 568, 8,322,044, and 8,004,410, the disclosures of which are incorporated by reference herein in their respective entirety.

Multi-frequency RFID tags such as the RFID switch tag 1200 are also described in Reissued U.S. Patent Nos. RE 43,355 and RE 44,691, the disclosures of which are incorporated by reference herein in their respective entirety.

Parent application Ser. No. 15/160,982, discloses a module that is similar to 300 that can itself me interfaced with an booster antenna and removed therefrom in order to interface with an booster antenna in another substrate, such as in a card. Here, the module 1220 can be included in a card or other substrate as described, which itself can be interface with the booster antenna 1230. This allows the inclusion of a switching mechanism as described above, which can allow the user to switch between, e.g., the HF and UHF modules in order to enable various functionality or applications. The switching can occur when the module 1220 is interface with substrate 1210, or when it is removed therefrom. Again U.S. patent application Ser. No. 15/160,982, entitled "Multi-Frequency Radio Frequency Identification Tag," filed May 20, 2016, which in turn claims priority to U.S. provisional Patent Application No. 62/165,167, also entitled "Multi-Frequency Radio Frequency Identification Tag," filed May 21, 2015; U.S. patent application Ser. No. 14/818,257, entitled "Methods and Apparatus for Preserving Privacy in an RFID System," filed Aug. 4, 2015, which in turn claims priority to U.S. patents application Ser. Nos. 14/229,786, now U.S. Pat. No. 9,098,790, entitled "Methods and Apparatus for Preserving Privacy in an RFID System," filed Mar. 28, 2014, which in turn claims priority to U.S. patents application Ser. No. 13/736,819, now U.S. Pat. No. 8,710,960, entitled "Methods and Apparatus for Preserving Privacy in an RFID System," filed Jan. 8, 2013, which in turn claims priority to U.S. patents application Ser. No. 12/364,158, now U.S. Pat. No. 8,350,673, entitled "Methods and Apparatus for Preserving Privacy in an RFID System," filed Feb. 2, 2009, which in turn claims priority to U.S. provisional Patent Application No. 61/025,000, also entitled "Method and Apparatus for Preserving Privacy in RFID Systems," filed Jan. 31, 2008; U.S. patent application Ser. No. 14/480,458, entitled "RFID Switch Tag," filed Sep. 8, 2014, which in turn claims priority to U.S. patents application Ser. No. 13/465,829, now U.S. Pat. No. 8,844,831, entitled "RFID Switch Tag," filed May 7, 2012, which in turn claims priority to U.S. provisional Patent Application Nos. 61/487,372, filed May 18, 2011 and 61/483,586, filed May 6, 2011, both entitled "RFID Switch Tag;" U.S. Patent Application No. 14/578, 196, entitled "RFID Switch Tag," filed Dec. 19, 2014, which in turn claims priority to U.S. patent application Ser. No. 14/060,407, now U.S. Pat. No. 8,944,337, entitled "RFID Switch Tag," filed Oct. 22, 2013, which in turn claims priority to U.S. patents application Ser. Nos. 13/465,834, now U.S. Pat. No. 8,561,911, entitled "RFID Switch Tag," filed May 7, 2012, which in turn claims priority to U.S. provisional Patent Application Nos. 61/487, 372, filed May 18, 2011 and 61/483,586, filed May 6, 2011, both entitled "RFID Switch Tag," disclose various switching mechanism and methods for switching a module such as module 220.

Some applications can require a placement of metallic material (e.g., retro-reflective material, holographic image) over the RFID switch tag 1200. In order to preserve the transmission and reception capabilities of the RFID switch tag 1200, a selective de-metallization process may be employed to treat the metallic material. Selective de-metallization is described in U.S. Pat. Nos. 7,034,688 and 7,463, 154, the disclosures of which are incorporated by reference herein in their respective entirety.

Figure 15:
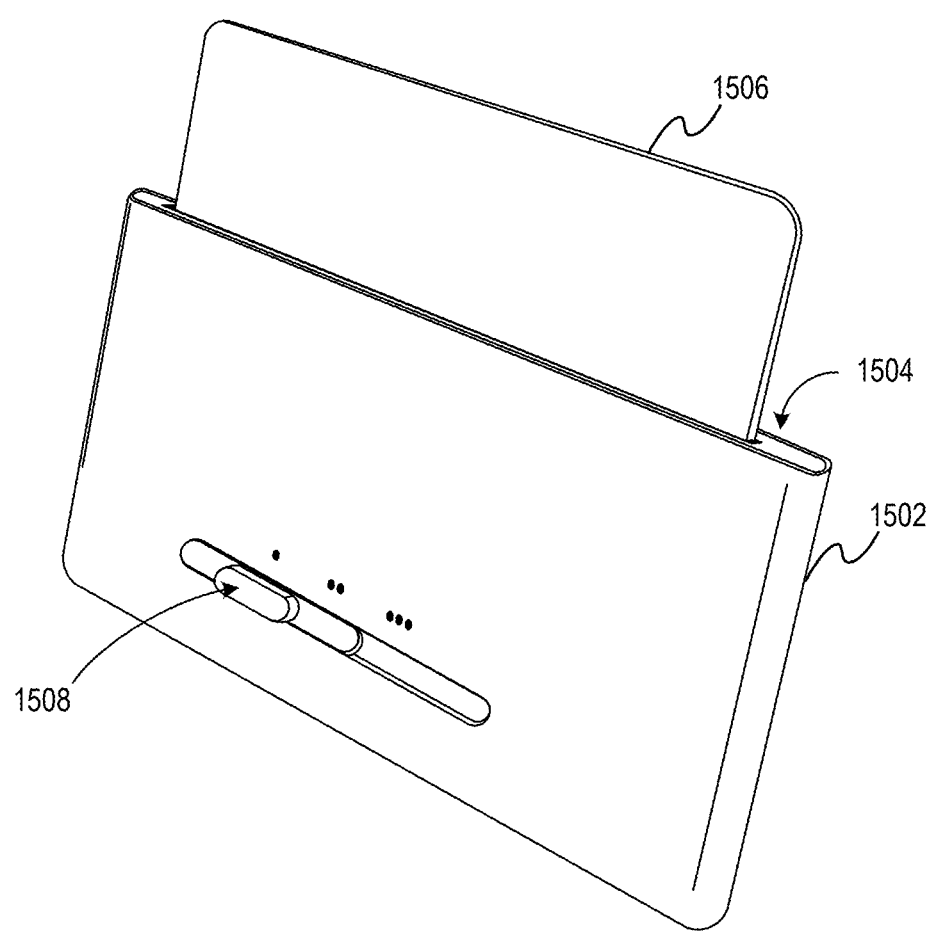
FIG. 15 shows a perspective view of a RFID system in accordance with another embodiment described herein.

In certain embodiments, the NFC, or HF tag or portion of the detachable component 1220 can actually take the form of a card for use in an, e.g., NFC application. For example, the card could be a transit card used to access public transit. The card can be modified as described herein, however, to include at least one UHF module or component that can be couple to a booster antenna when the, e.g., transit card is inserted into a base unit. This is illustrated in FIG. 15, which shows a base unit 1502 with slot 1504 configured to receive card 1506. As will be described with respect to FIG. 16, base unit 1502 can also comprise a booster antenna that can couple with a UHF module included in card 1506. In this manner, when card 1506 is inserted in slot 1504, a UHF "tag" is formed that can, e.g., function within a tolling environment.

In certain embodiments, card 1506 can include multiple UHF module for, e.g., various tolling settings or applications as described above. In this case, a switch 1508 can be included in order to allow the booster antenna to interface with the appropriate UHF module. When switch 1508 is slid from one setting to another, the booster antenna is moved so that it will couple with the appropriate module.

Figure 16B:
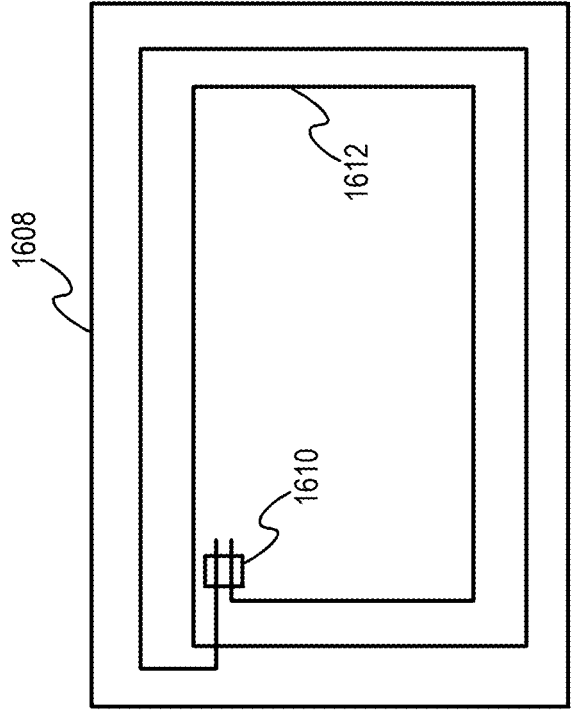
FIGS. 16A-D show the components of the embodiment shown in FIG. 5.
Figure 16A:
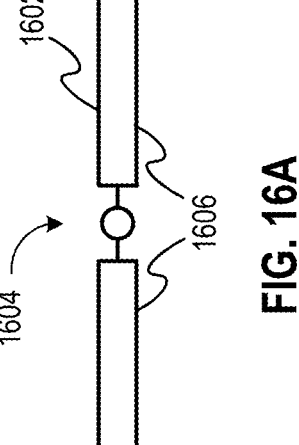

FIGS. 16A-16D illustrates the components of the system illustrated in FIG. 15. First, a UHF module 602 is illustrated in FIG. 16A. As can be seen, module 1602 includes a chip 1604 and leads 1606. In this embodiment, leads 1606 do not act as an antenna. This is to avoid coupling with the HF antenna 1612, which is in close proximity with the UHF module 1602 included with in the same substrate 1608.

Figure 16C:
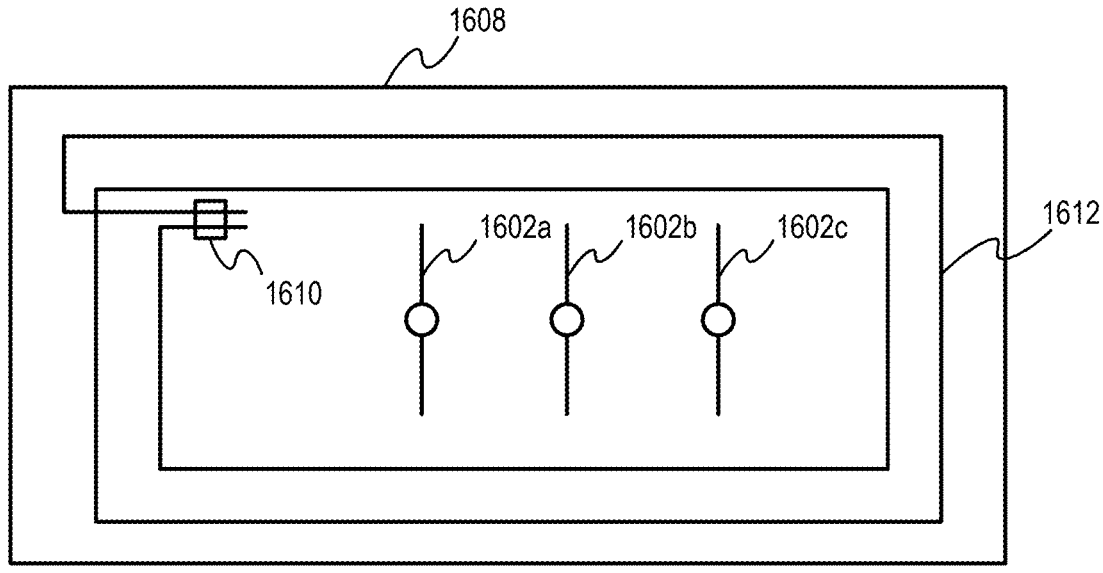

FIG. 16B illustrates the HF subsystem within card 1502. As noted, card 1502 will include a substrate 1608 onto, or into which an HF antenna 1612 has been formed. Antenna 1612 is then coupled with a HF chip 1610. Modules 1602 can then be place on substrate 1608 as illustrated in FIG. 16C. In the example of FIG. 16B, the modules 1602a-c are placed in the center of the substrate and substantially in the center of the loops that form antenna 1612.

Figure 16D:
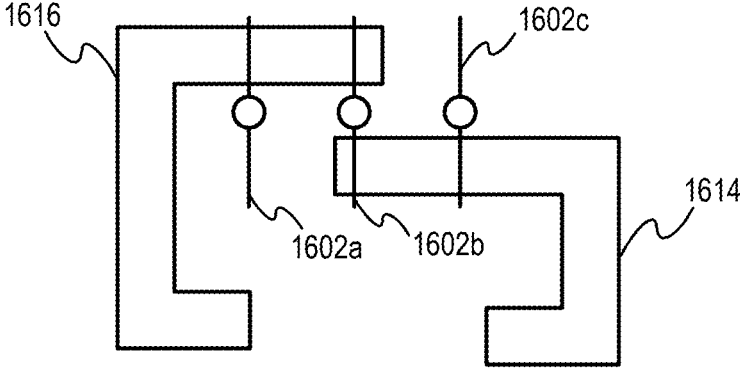

As illustrated in FIG. 16D, Antenna portions 1614 and 1616 can then be included within base unit 1502. When card 1506 is inserted in slot 1504, antenna portions 1614 and 1616 can couple, e.g., inductively with a module 602. If there are multiple modules, then antenna portions 1614 and 1616 can be connected with switch 1508, such that when switch 1508 is slid back and forth between the various positions, the antenna will couple with the appropriate module 1602a-c.

While various embodiments of the present invention have been described above, it should be understood that they have been presented by way of example only, and not of limitation. The breadth and scope of the present invention should not be limited by any of the above-described exemplary embodiments. Where this document refers to technologies that would be apparent or known to one of ordinary skill in the art, such technologies encompass those apparent or known to the skilled artisan now or at any time in the future. In addition, the invention is not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the present invention.

Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A switchable radio-frequency identification (RFID) tag device comprising:

a case:

a first RFID module positioned on a first plane;

at least one un-tuned antenna section positioned on a second plane, wherein the first plane is positioned parallel to the second plane;

a second RFID module positioned on the first plane;

a third RFID module positioned on the first plane; and a rotatable switch configured to move between a first position, a second position, and a third position; and wherein, in the first position, the first RFID module is coupled to the at least one un-tuned antenna section to form a tuned RFID tag, and the second and third RFID modules are detuned and/or inoperable; and in the second position, the second RFID module is coupled to the at least one un-tuned antenna section to form a tuned RFID tag, and the first RFID module and third RFID module are detuned and/or inoperable; and in the third position, the third RFID module is coupled to the at least one un-tuned antenna section to form a tuned RFID tag, and the first and second RFID modules are detuned and/or inoperable, wherein:

the rotatable switch causes a first visual indicator to display or be indicated on the case when in the first position, and the rotatable switch causes a second visual indicator to display or be indicated on the case when in the second position, and the rotatable switch causes a third visual indicator to display or be indicated on the case when in the third position.

2. The device of claim 1, wherein the first, second and third RFID modules include an integrated circuit and a conductive trace pattern.

3. The device of claim 1, wherein the first, second and third RFID modules are formed on a first substrate, the first substrate being positioned on the first plane, and the at least one un-tuned antenna section is formed on a second substrate, the second substrate being positioned on the second plane.

4. The device of claim 1, wherein the first, second, and third RFID module, the at least one un-tuned antenna section, and the rotatable switch are enclosed in the case.

5. A switchable radio-frequency identification (RFID) tag device comprising:

a first RFID module, a second RFID module, and a third RFID module, each including an integrated circuit and conductive trace pattern;

a rotatable switch mechanism, wherein rotation to one of a plurality of positions selects which RFID module is operational; and a plurality of tuned antennas arranged in a common plane, each selectively coupled to a respective RFID module via the rotatable switch mechanism;

wherein a plurality of tuned antennas are selectively coupled to a respective RFID module via the rotatable switch mechanism, wherein, the first RFID module, the second RFID module, or the third RFID module is electrically coupled to a corresponding tuned antenna to form a tuned RFID tag, and the other RFID modules are electrically isolated or detuned such that they are inoperable, and wherein the rotatable switch mechanism provides a mechanical or haptic feedback at each position.

6. The device of claim 5, wherein each tuned antenna is tuned to a distinct frequency band, enabling frequency-selective operation of each RFID module.

7. The device of claim 5, wherein the rotatable switch mechanism comprises a dial or knob.

8. The device of claim 5, wherein the rotatable switch mechanism is magnetically actuated.

9. The device of claim 5, wherein the RFID modules further comprise shielding elements to prevent interference between RFID modules when only one is active.

10. The device of claim 5, wherein at least one antenna element comprises a booster antenna that is inductively coupled to its respective RFID module without a direct electrical connection.

\* \* \* \* \*